United States Patent [19]

Seckendorf et al.

[11] 4,325,619
[45] Apr. 20, 1982

[54] CAMERA

[75] Inventors: Bernard A. Seckendorf, Flushing; Jack W. Kalbfeld, Old Bethpage, both of N.Y.

[73] Assignee: Wrist-A-Matic, Ltd., Elmhurst, N.Y.

[21] Appl. No.: 205,209

[22] Filed: Nov. 7, 1980

[51] Int. Cl.³ .................. G03B 19/02; G03B 17/26; G03B 9/10
[52] U.S. Cl. .................................. 354/121; 354/250; 354/288
[58] Field of Search .................. 354/226, 76, 275, 250, 354/288, 120–124

[56] References Cited

U.S. PATENT DOCUMENTS

| 604,733 | 5/1898 | Daniels | 354/250 X |
| 2,531,653 | 11/1950 | Tait et al. | 354/121 |
| 2,625,087 | 1/1953 | Steineck | 354/121 |
| 2,899,879 | 8/1959 | Lopez | 354/76 |
| 4,081,806 | 3/1978 | Seckendorf | 354/121 |

Primary Examiner—Donald A. Griffin
Attorney, Agent, or Firm—Jordan and Hamburg

[57] ABSTRACT

A wrist camera having a cassette housing for receiving a cassette, and a front housing enclosing a shutter assembly. The cassette includes a gear cup for holding a film in a recess of a first cassette disc, and a second cassette disc rotatably held in the first cassette disc. The cassette discs have projections cooperating with one another and with a projection in the front housing, to enable alignment of apertures therein. The shutter in the front housing has magnets cooperating with a magnet on an actuator, to open the optical axis by a magnetic repulsion force, as well as by a magnetic attraction force.

25 Claims, 49 Drawing Figures

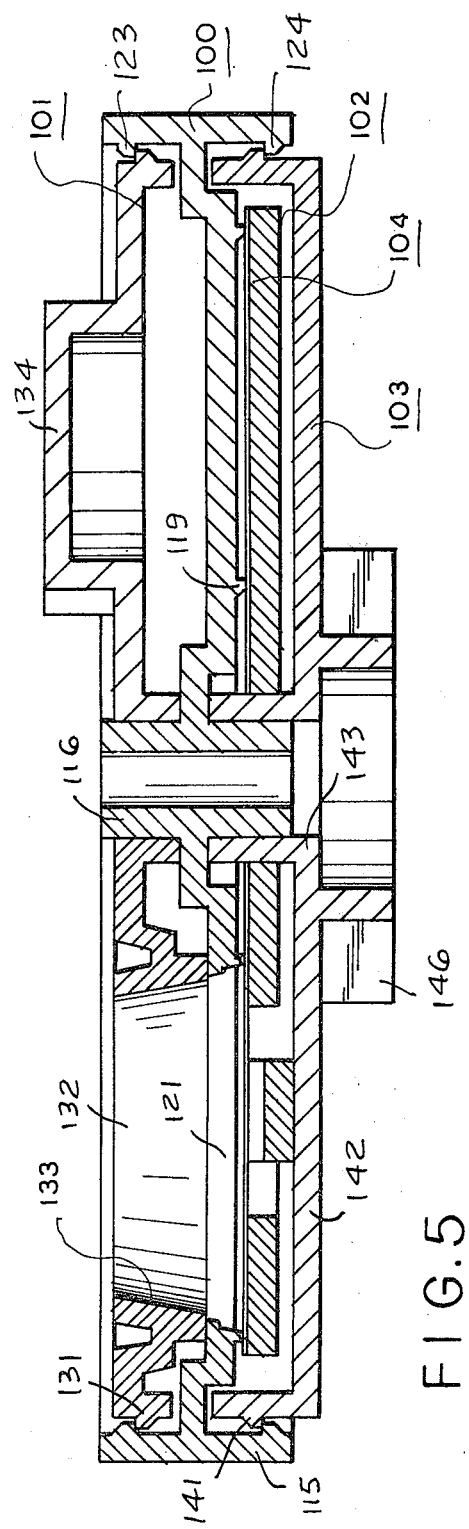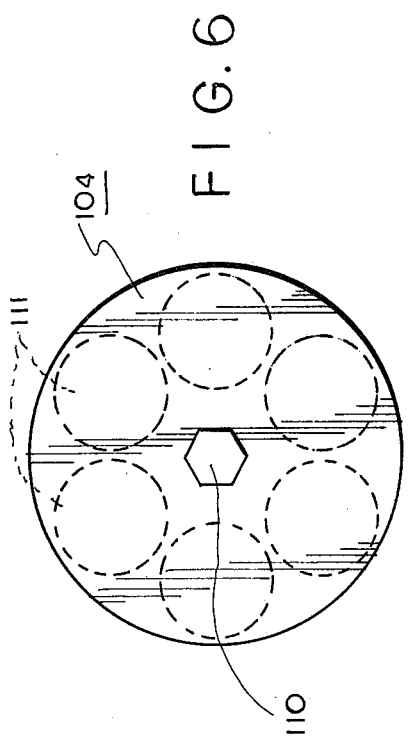
FIG. 5
FIG. 6

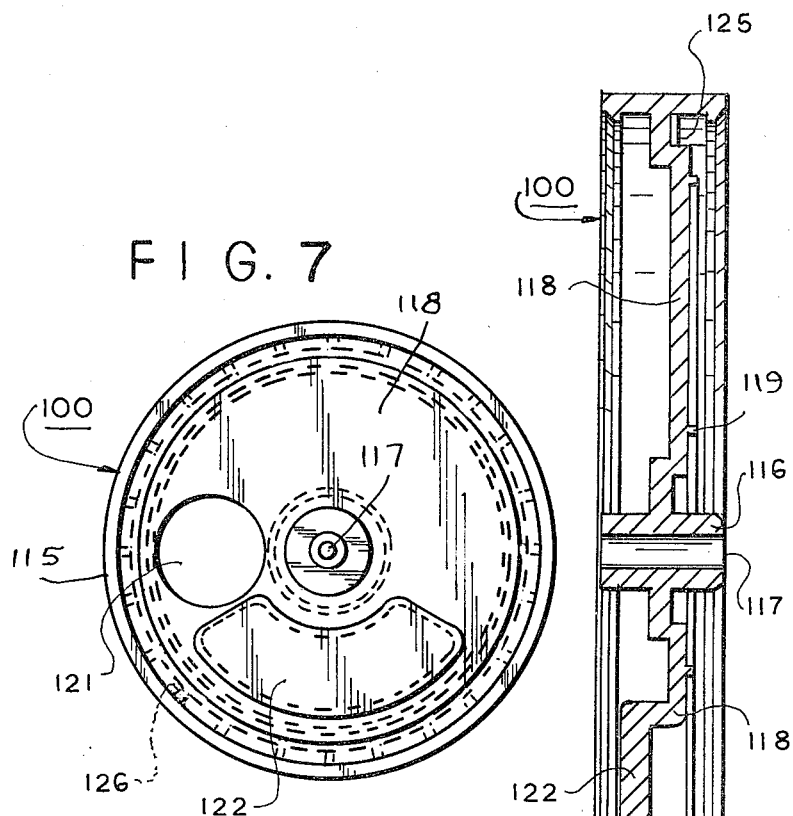
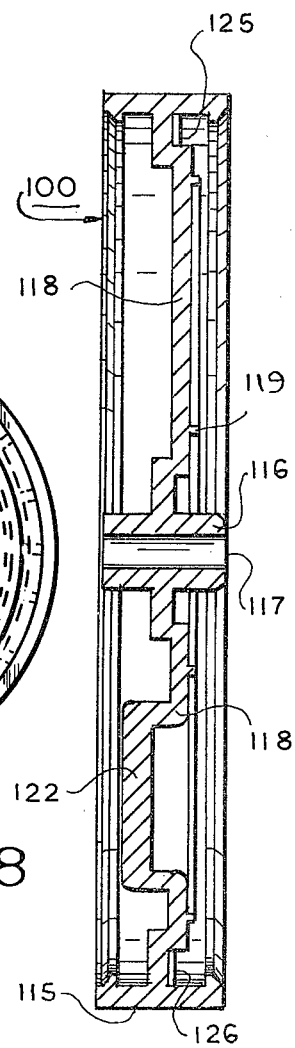
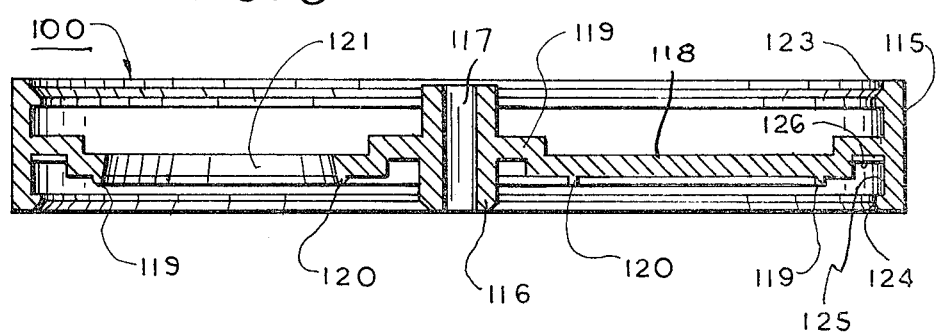

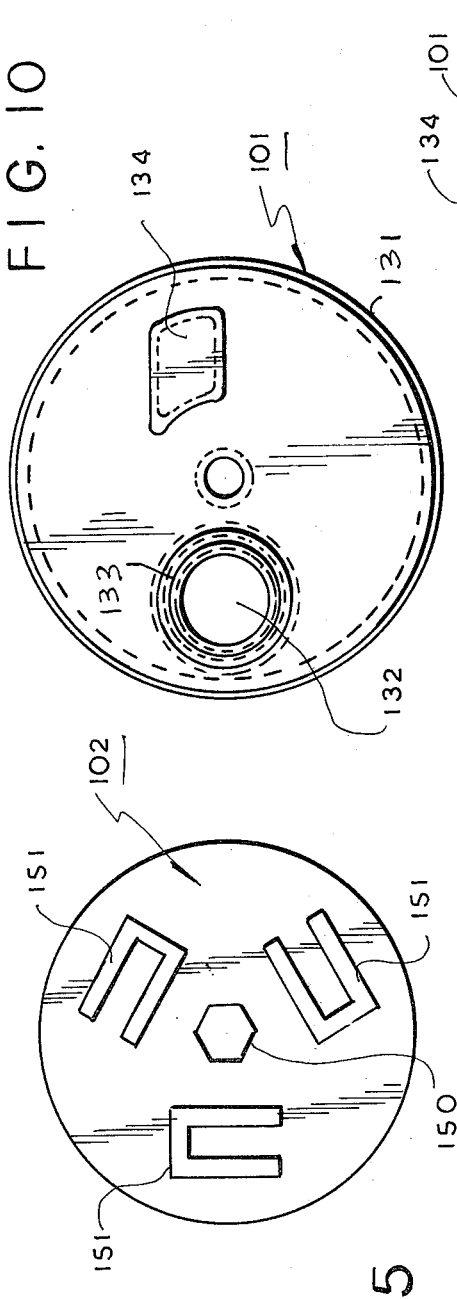
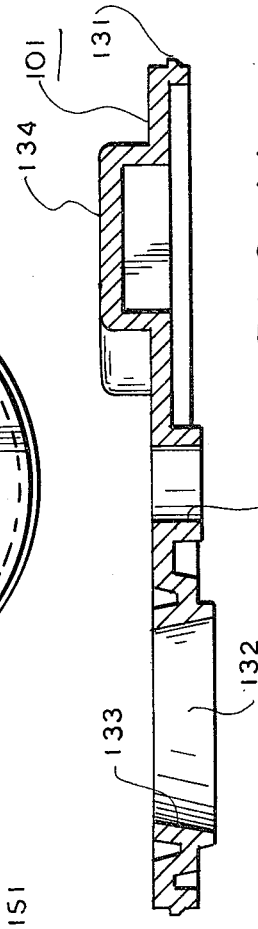
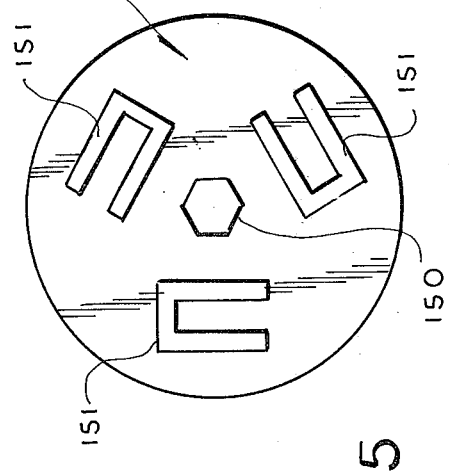
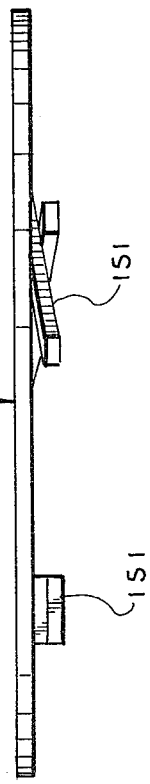

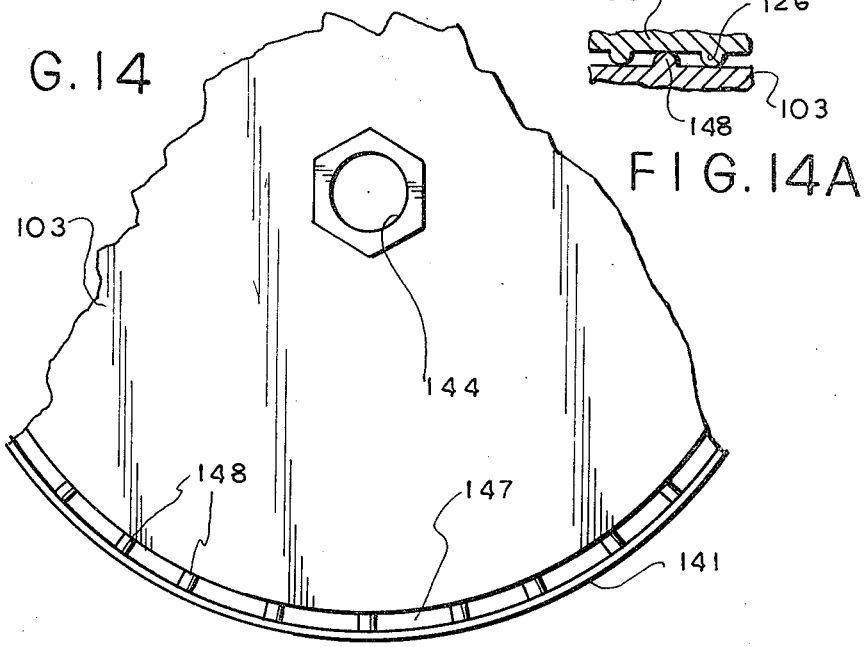
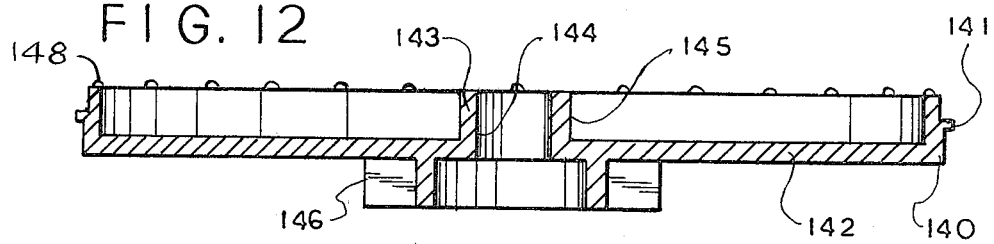
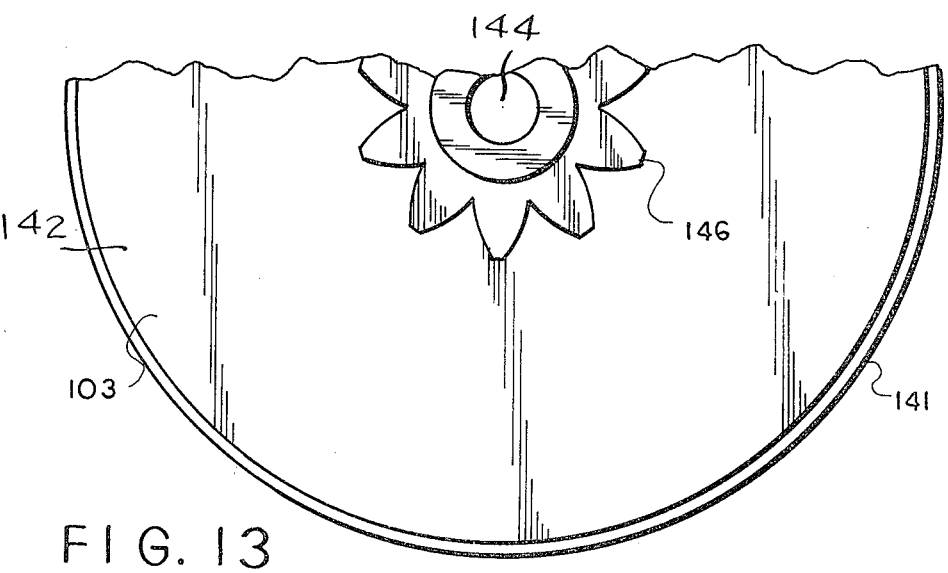

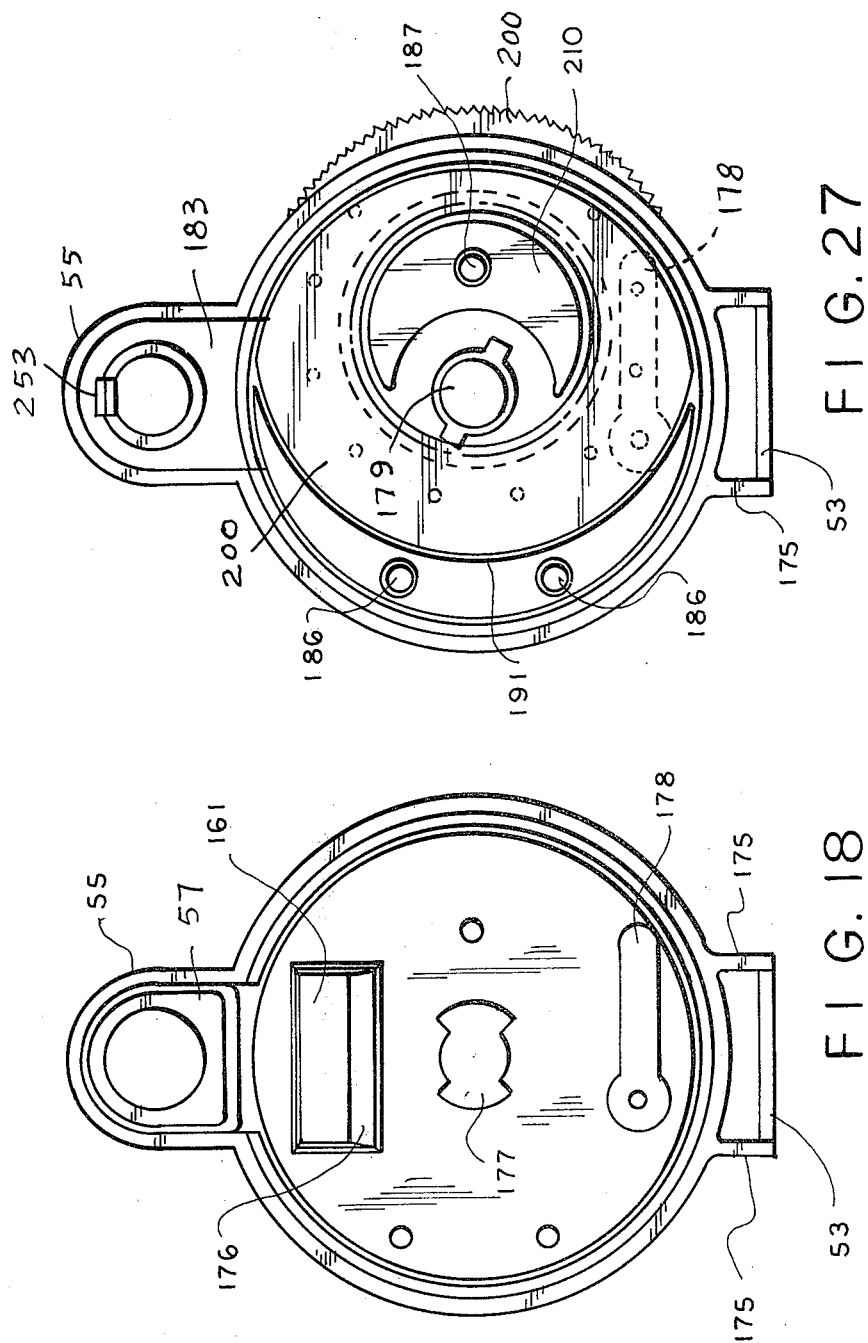

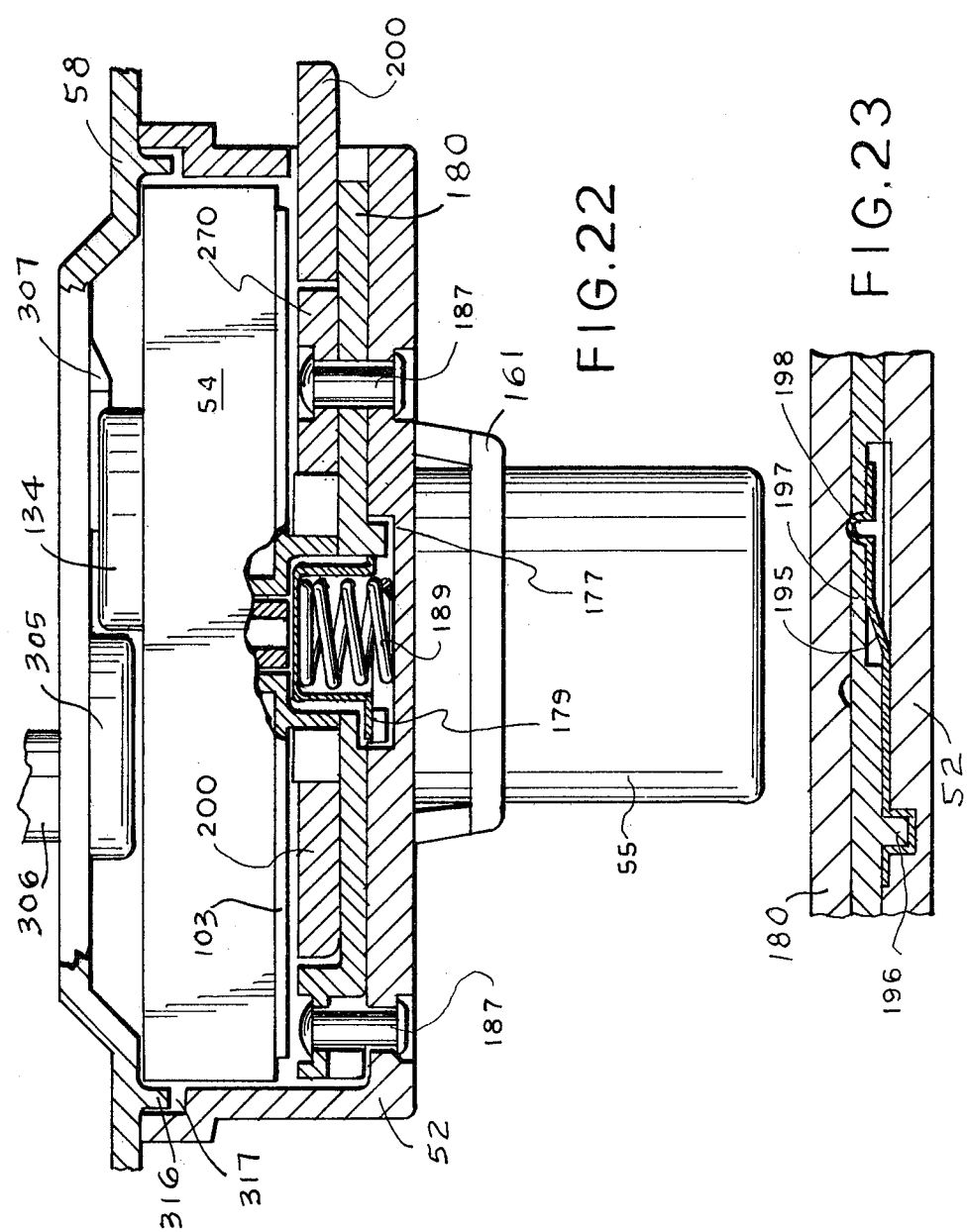

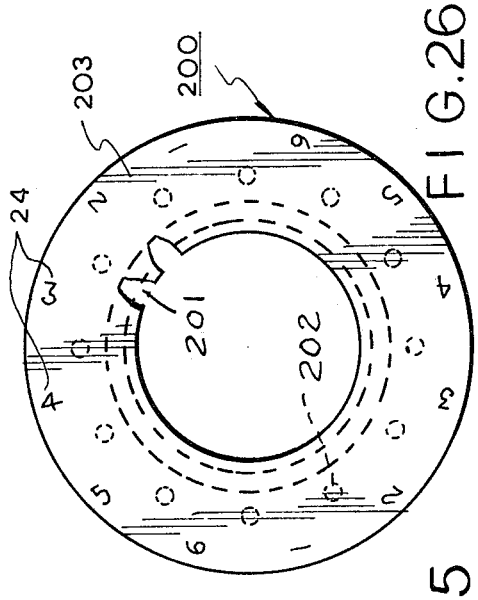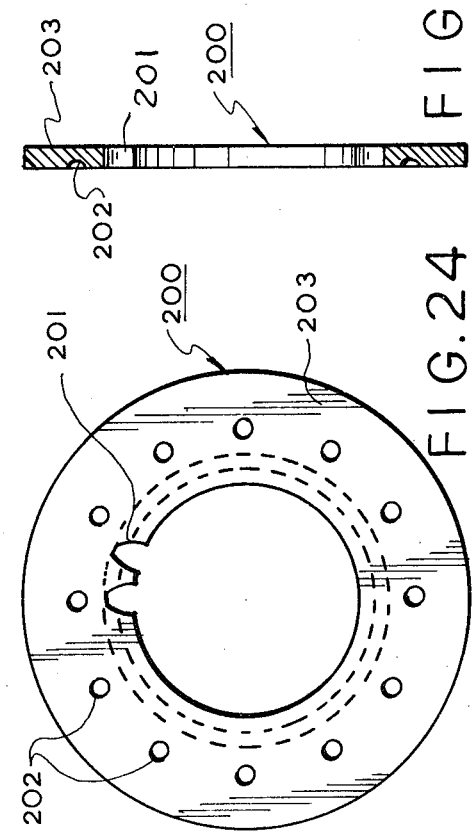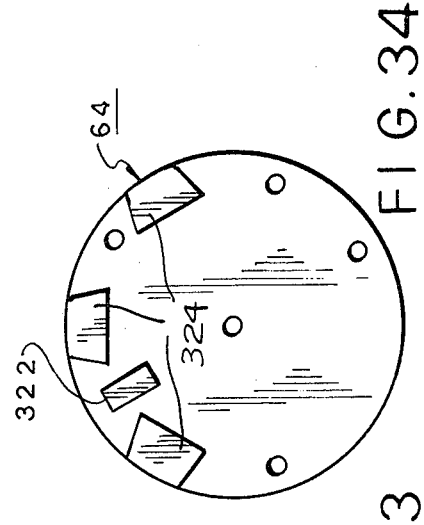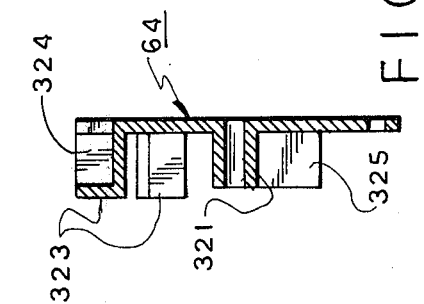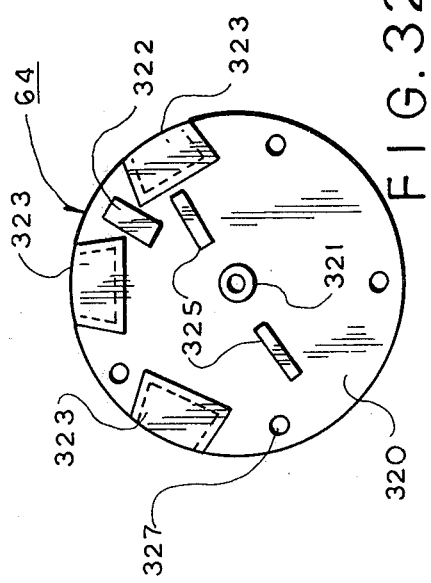

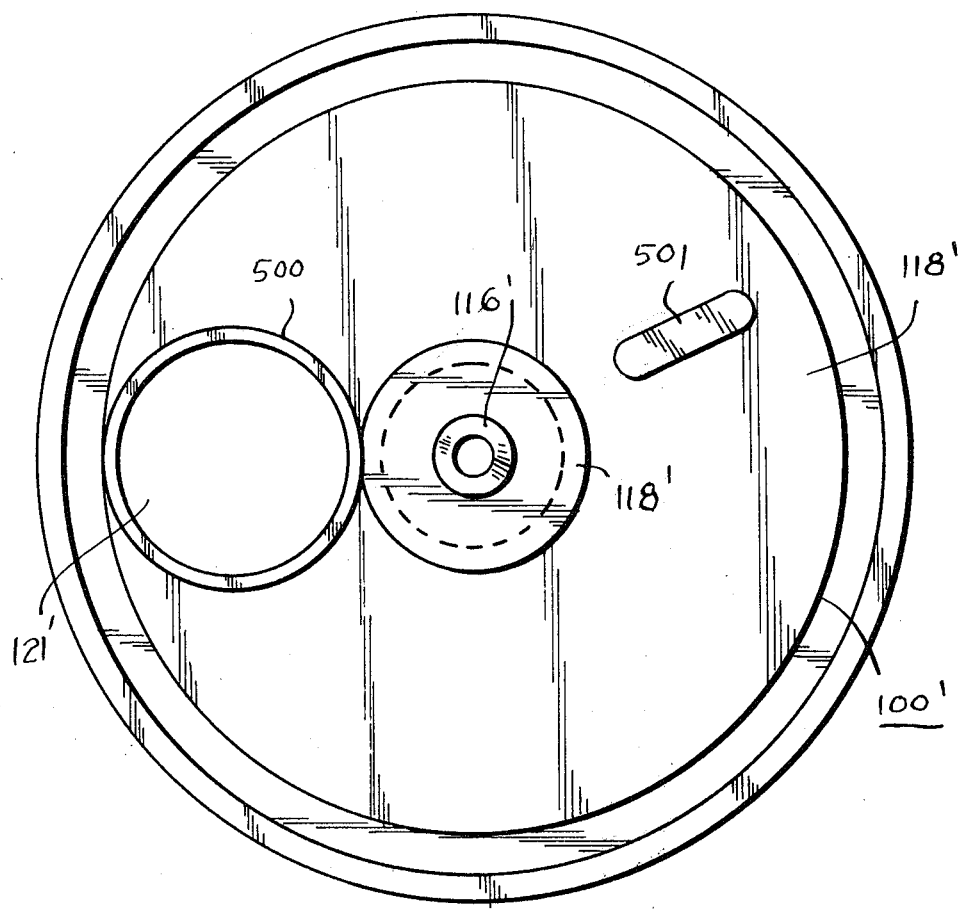
FIG. 43
FIG. 44
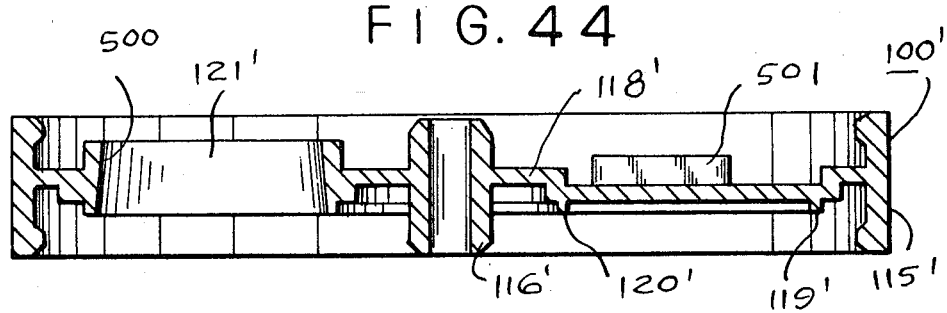

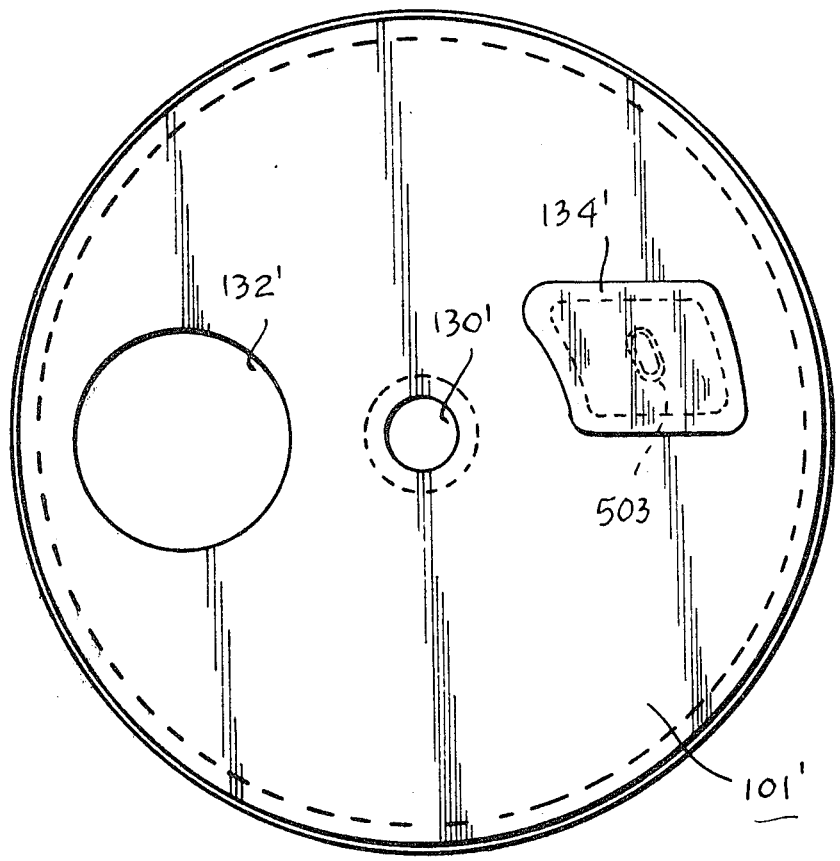
FIG. 45
FIG. 46
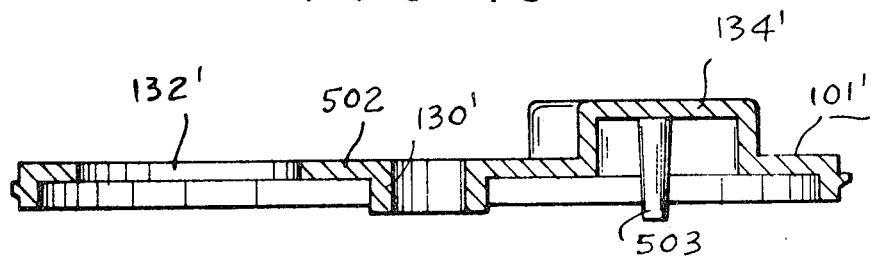

CAMERA

BACKGROUND OF THE INVENTION

This invention relates to cameras, and is more particularly directed to the provision of a miniature camera which may be worn, for example, only on the wrist of a user.

A camera of this type is disclosed in U.S. Pat. No. 4,081,806. This camera includes a cassette housing having an externally rotatable gear for rotating a cassette within the housing. The cassette, which holds a disk-shaped film, has a pair of relatively rotatable cassette covers. The front of the housing includes a shutter assembly actuated by a magnet movable by an operator, externally of the housing.

SUMMARY OF THE INVENTION

The invention is directed to providing an improved camera of the type disclosed in U.S. Pat. No. 4,081,806. Briefly stated, the gear in the cassette housing for controlling the cassette is an internal ring gear. Further, the cassette includes a lower disk, and a gear cup and upper disk relatively rotatably mounted in recesses in the opposite sides of the lower disk. The gear cup may be mounted to be driven by the internal ring gear of the cassette housing, and holds a disc film resiliently against the rear side of the lower disk.

The front of the camera housing includes a lens assembly, a shutter, and an actuator. The shutter retaining plate, for holding the shutter, also includes projections for limiting the rotary movement of the shutter, and for enabling alignment of apertures in the disk of the cassette with the optical axis of the front housing.

The actuator, which may be an annular member, carries a magnet positioned to control the movement of the shutter, by magnetic repulsion and attraction forces on the shutter.

The various features of the invention provide more simple operation of the camera, and improved operation of the shutter.

BRIEF FIGURE DESCRIPTION

In order that the invention may be clearly understood, it will now be disclosed in greater detail with reference to the accompanying drawings wherein:

FIG. 5 is a diametrical sectional view of the cassette of the camera;

FIG. 6 is a plan view of a film for the camera;

FIG. 7 is a top view of the lower disk of the cassette;

FIG. 8 is a diametrical sectional view of the lower disk;

FIG. 9 is the diametrical sectional view of the lower disk rotated 90 degrees from the view of FIG. 8;

FIG. 10 is a top view of the upper disk of the cassette;

FIG. 11 is a diametrical sectional view of the upper disk;

FIG. 12 is a diametrical sectional view of the gear cup of the cassette;

FIG. 13 is a partial bottom view of the gear cup of FIG. 12;

FIG. 14 is a top partial view of the gear cup of FIG. 12;

FIG. 14A is an enlarged, cross sectional view of the engaging surfaces of the lower disc and gear cup;

FIG. 15 is a top view of the spring cassette;

FIG. 16 is a side view of the spring of FIG. 15;

FIG. 18 is a front view of the cassette housing;

FIG. 22 is a partially cross sectional view of a portion of the cassette housing, with the cassette in position, to show the retaining spring;

FIG. 23 is another partial cross sectional view of the cassette housing, to show the detent;

FIG. 24 is a bottom view of the drive gear of the cassette housing;

FIG. 25 is a cross sectional diametrical view of the drive gear of FIG. 24;

FIG. 26 is a top view of a drive gear of FIG. 24;

FIG. 27 is a front view of the cassette housing, showing the retaining plate and drive gear assembled therein;

FIG. 31A is an enlarged cross sectional view showing the engagement between projections of the shutter retainer and cassette upper disc;

FIG. 32 is a rear view of one embodiment of the shutter;

FIG. 33 is a cross sectional view of the shutter of FIG. 32;

FIG. 34 is a front view of the shutter of FIG. 32;

FIG. 43 is a front view of a modification of the lower disc of the cassette;

FIG. 44 is a cross section of the lower disc of FIG. 42;

FIG. 45 is a front view of a modification of the upper disc for use in conjunction with the upper disc of FIG. 42; and FIG. 46 is a cross section of the upper disc of FIG. 44.

DETAILED DISCLOSURE OF THE INVENTION

Figure 1:
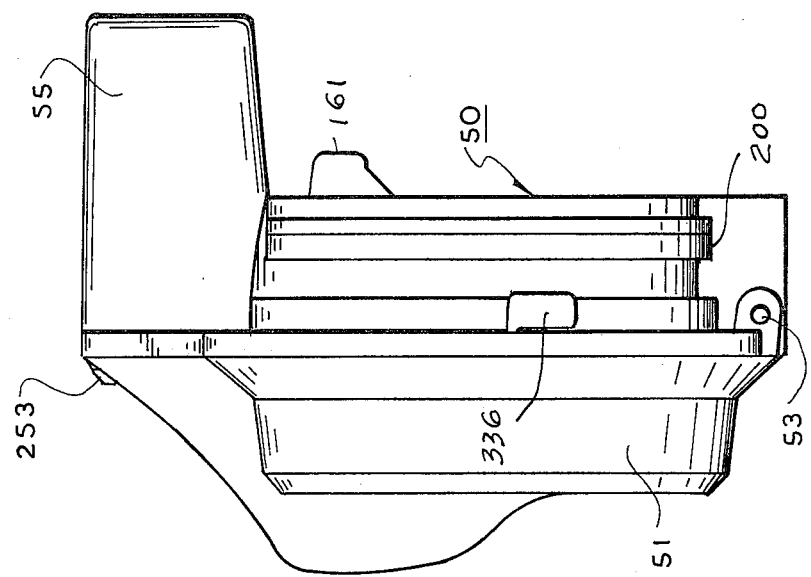
FIG. 1 is a side view of a wrist camera in accordance with the invention.
Figure 2:
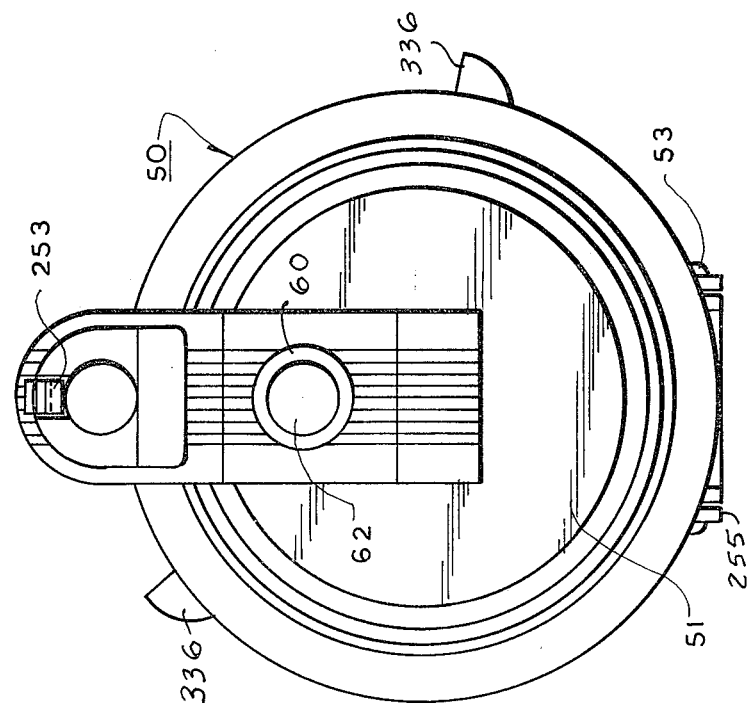
FIG. 2 is a front view of the camera of FIG. 1.
Figure 3:
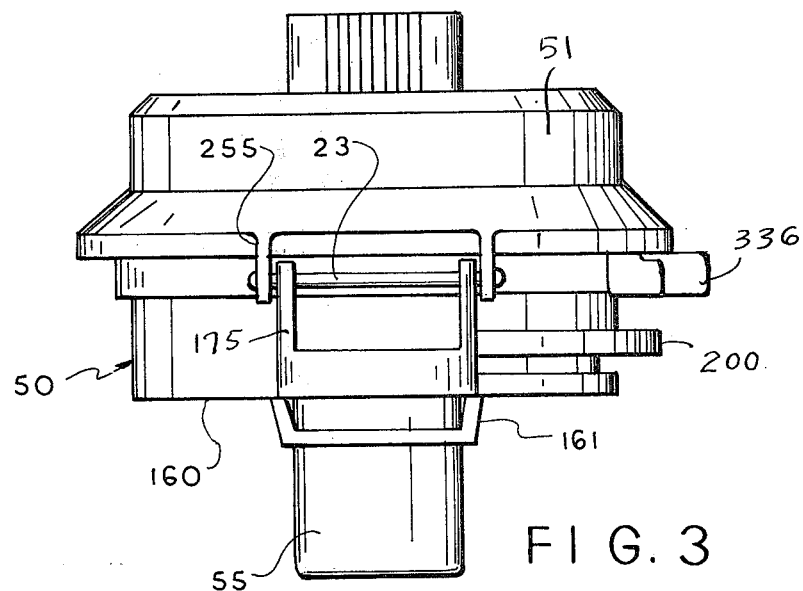
FIG. 3 is a bottom view of the camera of FIG. 1.
Figure 17:
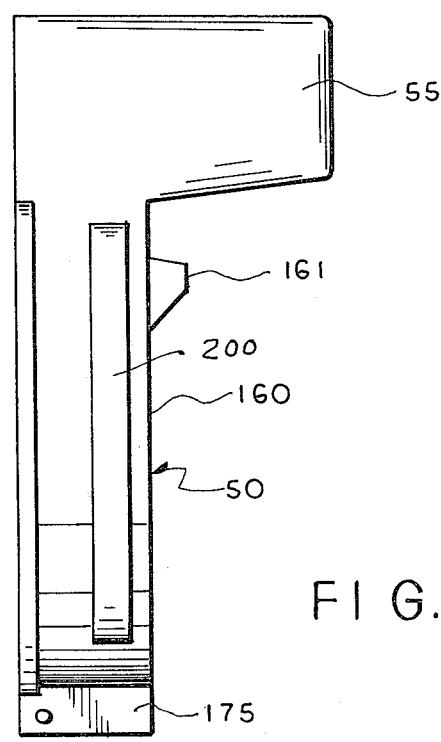
FIG. 17 is a side view of the cassette housing.

Referring now to FIGS. 1–4, therein is illustrated the wrist camera in accordance with the invention.

The body 50 of the camera includes a front housing 51 and a rear or cassette housing 52, hinged together at the hinge pin 53 to enable unloading and the loading of film cassette 54 adapted to be mounted within the cassette housing.

Figure 4:
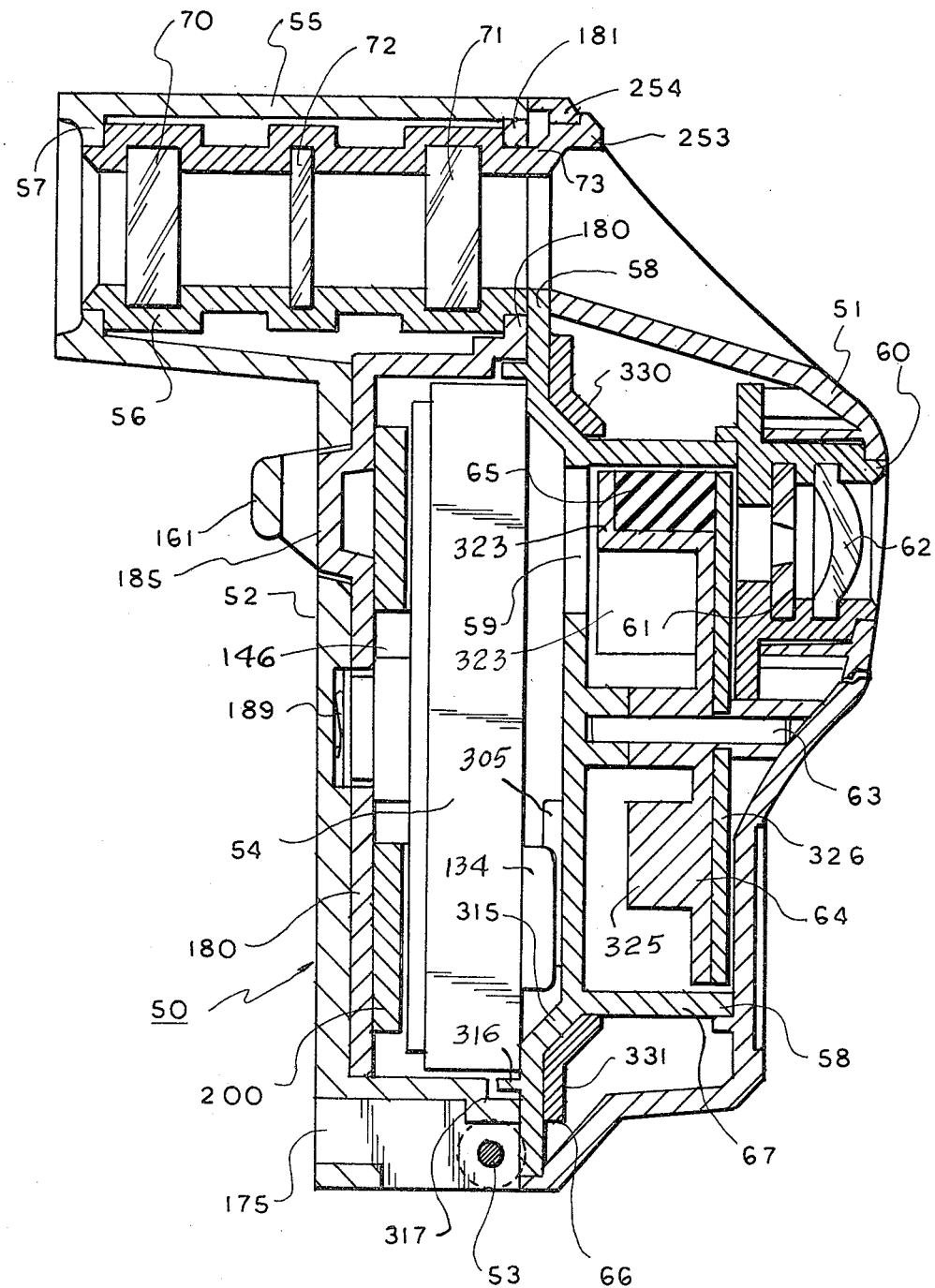
FIG. 4 is a longitudinal cross sectional view, from top to bottom, of the camera in accordance with the invention.

As seen more clearly in FIG. 4, the upper portion of the casette housing is formed with an elongated tube 55, and a view finder 56 is mounted in the tube 55. The tube 55 has an inwardly extending ridge 57 at its rear end, to engage the rear end of the viewfinder 56. The viewfinder extends parallel to the axis of the film cassette, and is displaced radially therefrom, for example, to be above the film cassette.

A shutter retainer 58 is mounted to the rear of the front housing 51, i.e., between the front housing and the cassette housing. The shutter retainer has an aperture 59 aligned with one offset portion of the film cassette. A lens holder 60, mounted in the front housing 51, is axially-aligned with the aperture 59, and has an aperture plate 61 and a lens 62 mounted therein. A shaft 63 is fixedly mounted to extend between the shutter retainer 58 and front housing 51, coaxially with the cassette 54. A shutter 64 is pivotally mounted on the shaft 63, between the shutter retainer 58 and front housing 51. The shutter 64 preferably carries at least three magnets 65 at its periphery one of which appears in FIG. 4, in order to be operated by an actuator 66. The actuator 66, as illustrated in FIG. 4, is ring shaped, at least in this portion thereof, to be rotatably mounted on an annular section 67 extending frontwardly on the shutter retainer 58. The extension 67 radially surrounds the shutter 64, and hence separates the shutter from the actuator 66.

Referring still to FIG. 4, the viewfinder 56 may comprise a tube within which a rear lens 70, a front lens 71, and a central screen 72 may be mounted, for example, in internal annular grooves in the viewfinder. The viewfinder is held in place by an extension 181 of a retaining plate 180, the extension 181 engaging a recess 73 adjacent the front of the viewfinder.

THE CASSETTE

The structure of the cassette 54 is shown in more detail in the cross sectional view of FIG. 5. In this view, it is seen that the cassette 54 is comprised of a lower disk 100, an upper disk 101, a spring member 102, and a gear cup 103. In addition, a disk shaped film 104 is sandwiched between the spring disk 102 and the lower disk 100. The film disk 104 is illustrated in FIG. 6. The outer periphery of the film 104 is essentially circular, and a polygonal, for example, hexagonal, aperture 110 is provided at the center of the disk, to prevent relative rotation between the disk 104 and the gear cup 103. The film 104 is illustrated in FIG. 6 as having a plurality of regularly spaced apart radially offset dotted circles 111, for example, six circles. These loci correspond to the areas which may be exposed, in sequential operations of the camera, when the areas are axially aligned with the aperture 59 of the shutter retainer 58 of FIG. 4.

The lower disk is illustrated in greater detail in FIGS. 7, 8 and 9. This disk is comprised of an annular rim 115, a central hub 116 with a circular aperture 117 therethrough, and a central web 118 extending between the hub and the rim. The central web has an annular downwardly extending ridge 119 spaced inwardly of the rim, for engaging the film disk. A further downwardly extending annular ridge 120 is provided extending downwardly spaced a short distance from the hub, for also engaging and holding the film. A circular aperture 121 is provided between and substantially extending to the two ridges 119 and 120. This aperture has a diameter substantially equivalent to the picture exposure areas on the film, and has a diameter slightly greater than that of the aperture 59 of the shutter retainer 58 on FIG. 4. The aperture 121 is hence positionable to be axially aligned with the aperture 59, at one angular displacement of the lower disk 100. In addition, the web 118 is upwardly recessed in quadrant 122 extending circumferentialy from adjacent to the aperture 121. In other words, the quadrant 122 may be considered to be an upwardly extending projection from the web of the lower disk.

The radially inner surface of the rim 115 of the lower disk has upper and lower annular ridges 123 and 124 respectively. As will be apparent from the following disclosure, these ridges are employed for holding the elements of the cassette together, in use, such that the upper disk and gear cup can be snapped into the upper and lower portions of the lower disk.

Immediately inside the rim 115 of the lower disk, the web 118 is provided with an annular recess 125 in this lower surface. The bottom of this recess, i.e., facing the rear of the cassette, is provided with a plurality of radially extending ridges 126. distributed about its circumference. These ridges, as will be discussed in greater detail in the following paragraphs, ensure simultaneous rotation of the lower disk and the gear cup at determined times in the operation of the camera.

The upper disk 101 is illustrated in greater detail in FIGS. 10 and 11. This disk is essentially circular, having a central circular aperture 130. The rim of the disk has an annular radially outwardly extending projection 131 to enable the disk to be snapped into and out of the upper hollow of the lower disk. A circular aperture 132 is provided extending through the disk radially displaced from its center, and alignable with and of slightly smaller diameter than the aperture 121 of the lower disk, the aperture 132 preferably being tapered. As illustrated more clearly in FIG. 5, a rim 133 is provided surrounding the aperture 132, the rim extending essentially in contact with the unraised portions of the central web of the lower disk 100 of the cassette.

The upper disk 101 further has an upwardly extending projection 134, generally opposite the aperture 132. As shown in FIG. 10, one radial edge of the projection 134 may lie on the line intersecting the axis of the apertures 130 and 132.

The gear cup 103 is more clearly illustrated in FIGS. 12, 13 and 14. The gear cup has an annular rim 140 with a radially outwardly projecting annular ridge 141 to enable the gear cup to be readily snapped into the lower recess of the lower disk. The web 142 of the gear cup extends centrally from the lower portion of the rim 140. A hub 143 projects upwardly from the web 142, and has a circular central aperture 144 therethrough. The outer periphery 145 of the hub is polygonal for example, hexagonal, for receiving the similarly shaped aperture of the film disk, thereby to prevent rotation between the gear cup and the film disk.

A central gear 146 is formed on the underside of the gear cup, surrounding the aperture 144.

As an alternative, the annular ridge 141 may be in the form of a plurality of arcuate segments of a ridge, to simplify the assembly of the cassette.

In the illustrated embodiment of the invention, the teeth of the gear 146 are dimensioned to have ten teeth. In a preferred embodiment of the invention, however, the gear 146 may have the same number of teeth, or an integral multiple, of the number of frames on the film, in order to simplify the adjustment of the film from frame to frame.

The front edge 147 of the rim 140 of the gear cup is provided with a plurality of radially extending ridges 148 distributed thereabout, the number of ridges being preferably substantially the same as the number of ridges 126 in the lower disk. The ridges 126 of the lower disk and the ridges 148 of the gear cup mutually engage one another when the gear cup is inserted in the recess of the lower disk. When the gear cup is resiliently urged against the web of the lower disk, the mutually engaging ridges resist relative rotational movement between the gear cup and the lower disk. This intermeshing is illustrated more clearly in the enlarged cross sectional view of FIG. 14A. The resilient force may be provided, for example, by the biasing spring 189 in the cassette housing. When, as will be discussed in the following paragraphs, rotational movement of the lower disk effects engagement between projections of the upper and lower disks and projections of the upper disk and shutter retainer, the resisting effect of the ridges 126 and 148 may be overcome, to thereafter permit relative rotation between the upper disk and the cup.

The spring 102 of the cassette is more clearly illustrated in FIGS. 15 and 16. This spring is in the form of a circular disk, having a polygonal central aperture to permit it to be aasembled on the central hub of the gear cup. Several generally U-shaped areas 151 are sheared from the disk, to extend resiliently downwardly from the disk, thereby to provide a spring action. As shown in FIG. 15, the areas 151 are equally spaced about the spring disk, and the U-shapes are preferably oriented with "vertical" axes normal to the radii of the disk.

Referring again to FIG. 5, it is seen that the spring disk 102 engages the bottom of the cup of the gear cup 103, to thereby resiliently urge the film disk 104 against the annular ridges in the bottom of the web of the lower disk 100. The lower disk only frictionally holds the gear cup (i.e., due to the ridges 126 and 148), so some angular displacement is possible therebetween. The film disk 104 and spring disk 102 however, must rotate with the gear cup 103 due to the provision of the polygonal cup on the gear cup.

As further shown in FIG. 5, the central aperture of the upper disk 101 receives the upper extending portion of the hub of the lower disk, and the holding ridge on the rim of the lower disk does not firmly hold the upper disk against rotation. As a result, a degree of angular displacement is possible between these two disks.

Before leaving the discussion of the cassette, it will be noted that the downwardly extending portion of the rim 133 of the aperture 132 of the upper disk, by extending substantially into engagement with the central web of the lower disk 100, may laterally engage the quadrant projection 122 of the web of the lower disk. When this occurs, it is evident that the two disks must rotate together, if the lower disk is driven in a given direction. The projection 134 of the upper disk may similarly be engaged at determined displacements by other elements of the camera. This will be described in greater detail in the following paragraphs.

CASSETTE HOUSING ASSEMBLY

As seen in FIGS. 1-4, and 17, the cassette housing 52 has an upper tubular portion 55 for holding the viewer assembly. The lower portion is generally annular, with the back surface 160 thereof being smooth, since this portion is adapted to rest against the wrist of a user. A loop 161 may extend from this surface, to enable a wrist band or the like to pass therethrough for holding the camera on the user's wrist.

Figure 19:
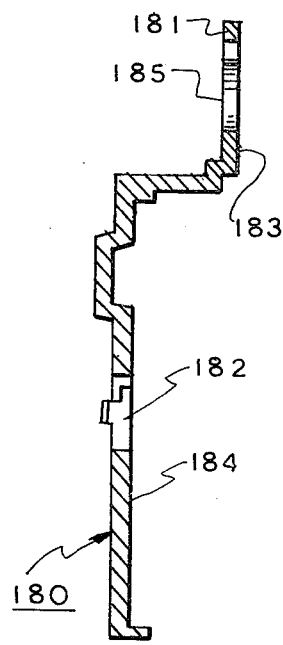
FIG. 19 is a cross sectional view of the retaining plate for the cassette housing.

As further seen in FIG. 18, which shows the interior of the cassette housing, the hinge pin 53 is held by downwardly extending projections 175 from the cassette housing. The back wall of the camera cassette housing, aligned with the loop 161, has a rectangular aperture 176. A central recess 177 is provided for a spring retainer, and a key hole shaped recess 178 is provided for a spring detent for the drive gear Referring to FIG. 4, it is seen that a retaining plate 180 is mounted in the hollow portion of the cassette housing, against the bottom of the housing. This element is separately shown in FIGS. 19, 20 and 21. The retainer plate has a generally circular lower portion 184 with a central aperture 182. An offset upper portion 183 has an aperture 185 positioned to engage the front of the viewfinder, as seen in FIG. 4. Thus, the viewfinder may be assembled in the cassette housing, with its rear end engaging the flange 57. Following this, the retaining plate 180 is installed, with the portion thereof surrounding the aperture 184 engaging the front portion of the viewfinder to hold the viewfinder in place.

Figure 20:
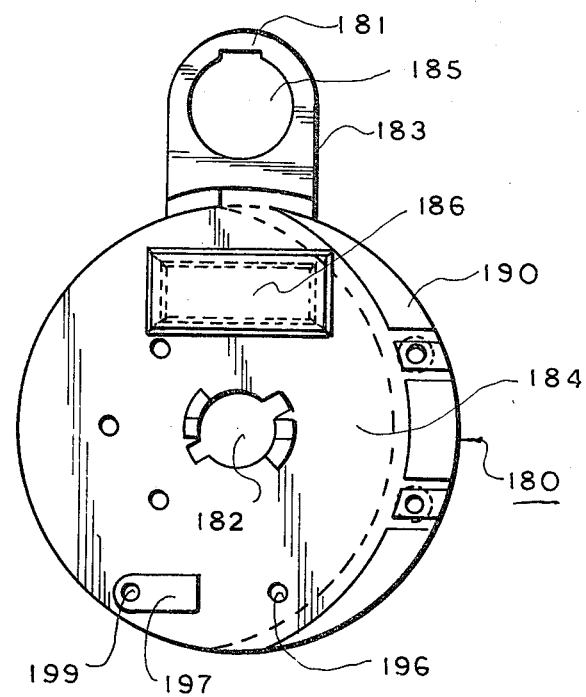
FIG. 20 is a rear view of the retaining plate of the cassette housing.
Figure 21:
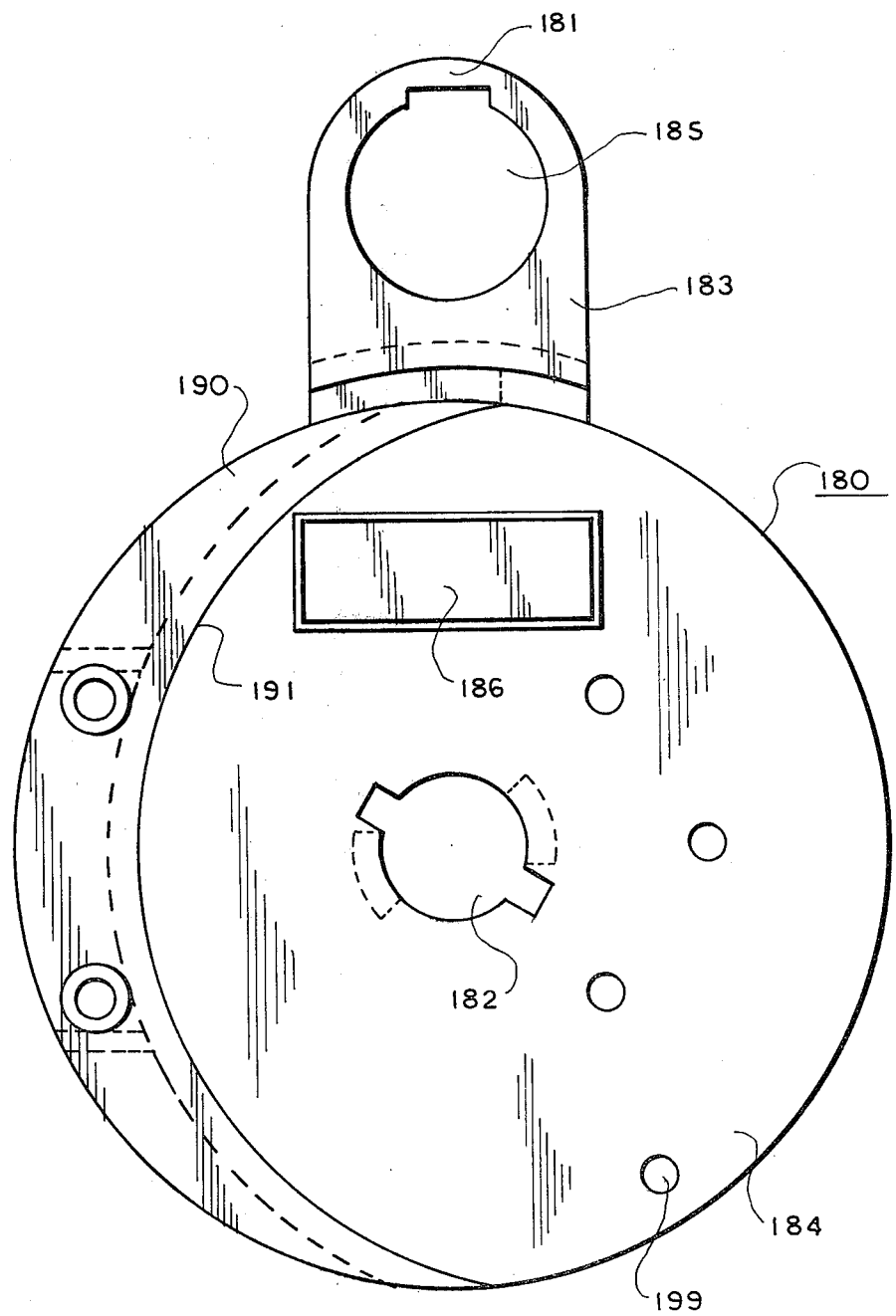
FIG. 21 is an enlarged front view of the retaining plate of the cassette housing.

The retaining plate 180 further has a rearwardly extending generally rectangular projection 186 which is received by the recess 176 of the cassette housing. In addition, as illustrated in FIG. 22, suitable rivets 187 and 188 may hold the retaining plate in the bottom of the cassette housing. As further illustrated in FIG. 22, a cup shaped spring retainer 179 is provided in recess 177 of the cassette housing, retaining a helical spring 189 therein. The spring urges the retaining cup 179 outwardly to bias the cassette 54 away from the bottom of the cassette housing. The biasing of the cassette away from the bottom of the cassette housing, serves to urge it against the shutter retainer 58. In addition, the spring 89 provides the resilient urging of the ridges 148 of the gear cup against the lower disk 100. The recess 177 of the cassette housing, and the central aperture 182 of the retainer plate, may be shaped to permit ready assembly of the spring retaining cup by the provision of suitable tangs on the edge of the cup, so that the cup may be twisted to retain it in position. FIG. 20 illustrates the surface of the retainer plate toward the cassette housing, and FIG. 21 illustrates this member on the opposite side. In these figures, it is seen that a lunate portion 190 is raised away from the bottom of the cassette housing, thereby to define an arcuate surface 191 that is radially offset from the axis of the retainer plate, i.e., the axis the central aperture 182.

As seen more clearly in FIGS. 20 and 23, a leaf spring 195 is mounted in the key shaped recess 178 of the cassette housing, and held therein by the pin 196 extending rearwardly from the retainer plate. The spring extends from the pin 196 into a recess 197 in the rear surface of the retainer plate, and a curved portion 198 of this spring resiliently extends thru an aperture 199 in the retainer plate. This curved portion 198 serves as a detent for the driving gear.

Referring again to FIG. 4, a drive gear 200 is positioned between the retainer plate 180 and cassette 154. This gear is more clearly illustrated in FIGS. 24, 25, and 26. The outer periphery of this disk shaped gear is knurled, and gear teeth 201 are provided at the inner edge, in other words, the gear is an internal ring gear. A plurality of circular recesses 202 are provided equally distributed about the back surface of the gear, to cooperate with the spring detent 198. The front surface 203 of the gear may be provided with indicia, such as numbers 204 imprinted or otherwise applied thereto, for indicating the position of the gear, and hence the position of the cup gear of the cassette.

The drive gear is assembled, as more clearly illustrated in FIG. 27, to be offset to the axis of the retainer. In other words the knurled outer periphery of the driving gear is guided by the offset arcuate surface 191 of the raised portion of the retainer plate. In addition, a lunate retainer plate 210 is mounted on the retaining plate 180 by means of the rivet 187, the lunate plate 210 having an arcuate surface adapted to guide the internal teeth of the drive gear. The teeth of the drive gear hence contact the teeth on only one side of the gear cup of the cassette, so that rotation of the drive gear results in rotation of the cup gear.

As is more clearly apparent in FIG. 27, the edge portion of the drive gear 200 extends through the side of the cassette housing, so that it can be rotated manually from the exterior of the camera. This manipulation enables the advancing and control of the position of the film in the camera, to permit multiple exposures.

THE FRONT HOUSING

Figures 28, 29:
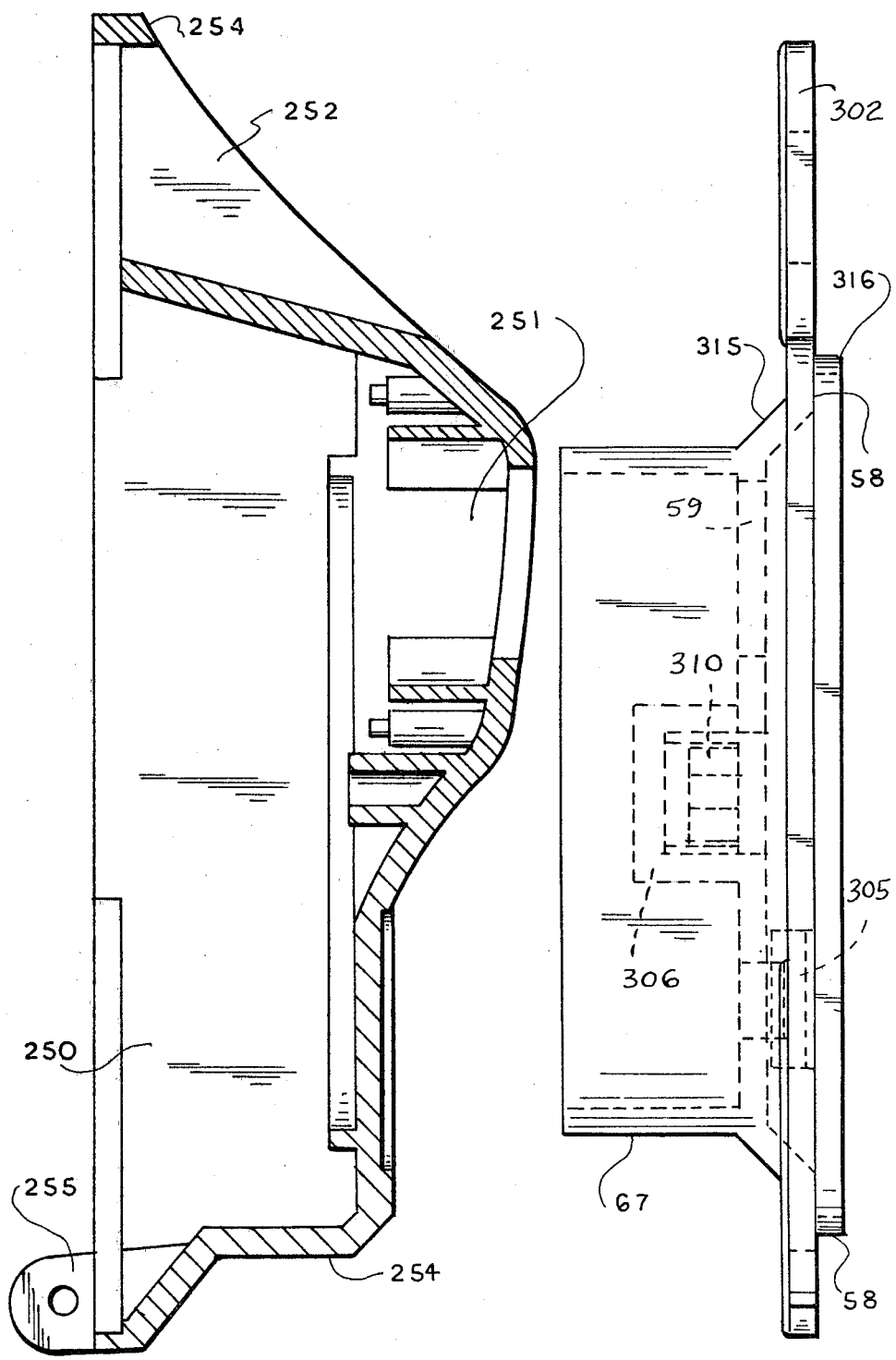
FIG. 28 is a cross sectional view of the front housing.
FIG. 29 is a side view of the shutter retainer.
Figure 28A:
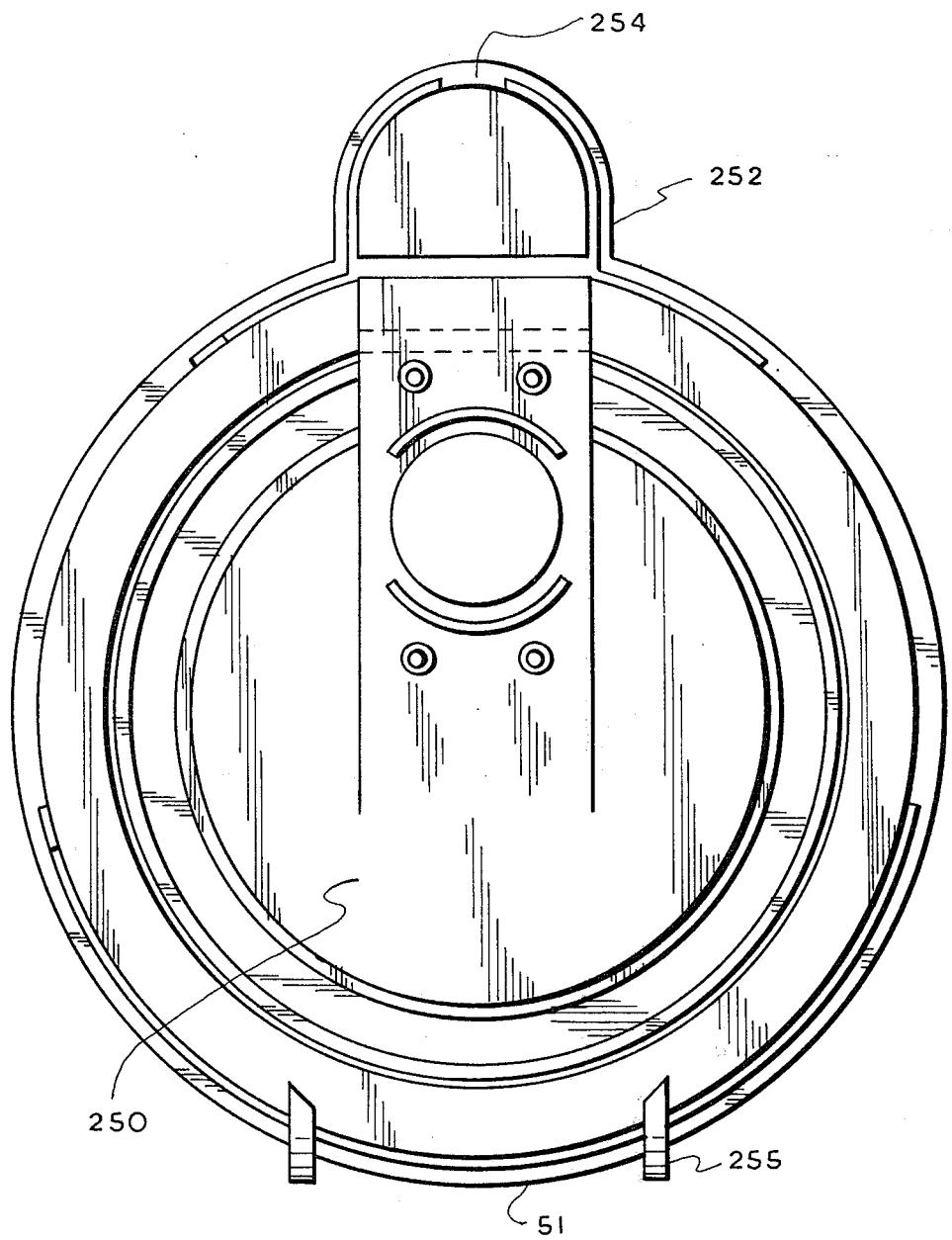
FIG. 28A is a rear view of the front housing.

The front housing 51 is more clearly illustrated in FIGS. 28 and 28A. This housing has a generally circular lower portion defining a central chamber 250.

A recess 251 is provided in the upper part of this portion for the lens assembly 60–62. An upper portion 252 of the front housing has a shaped aperture adapted to be aligned with the viewfinder. The front end 253 of the upper portion of the viewfinder, as illustrated in FIG. 4, extends forwardly into the aperture defined by the front housing, to serve as a catch for the upper edge 254 of the front housing. This catch may be released by depressing the front projection 253 of the viewfinder, to permit the camera to be hinged open at the hinge pin 53. FIG. 28 further shows ears 255 at the bottom of the front housing for receiving the hinge pin.

Figure 30:
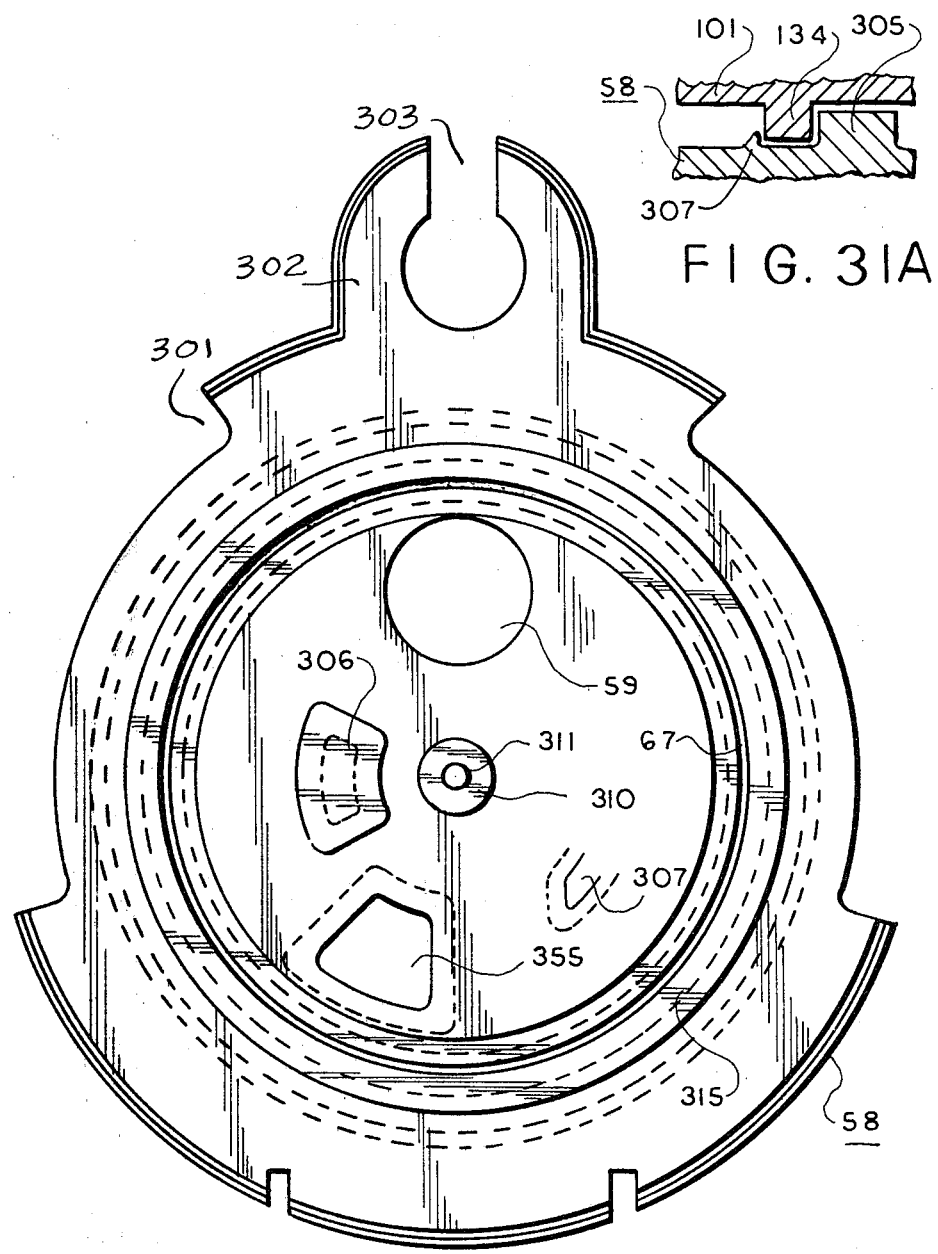
FIG. 30 is a front view of the shutter retainer, for the front housing.
Figure 31:
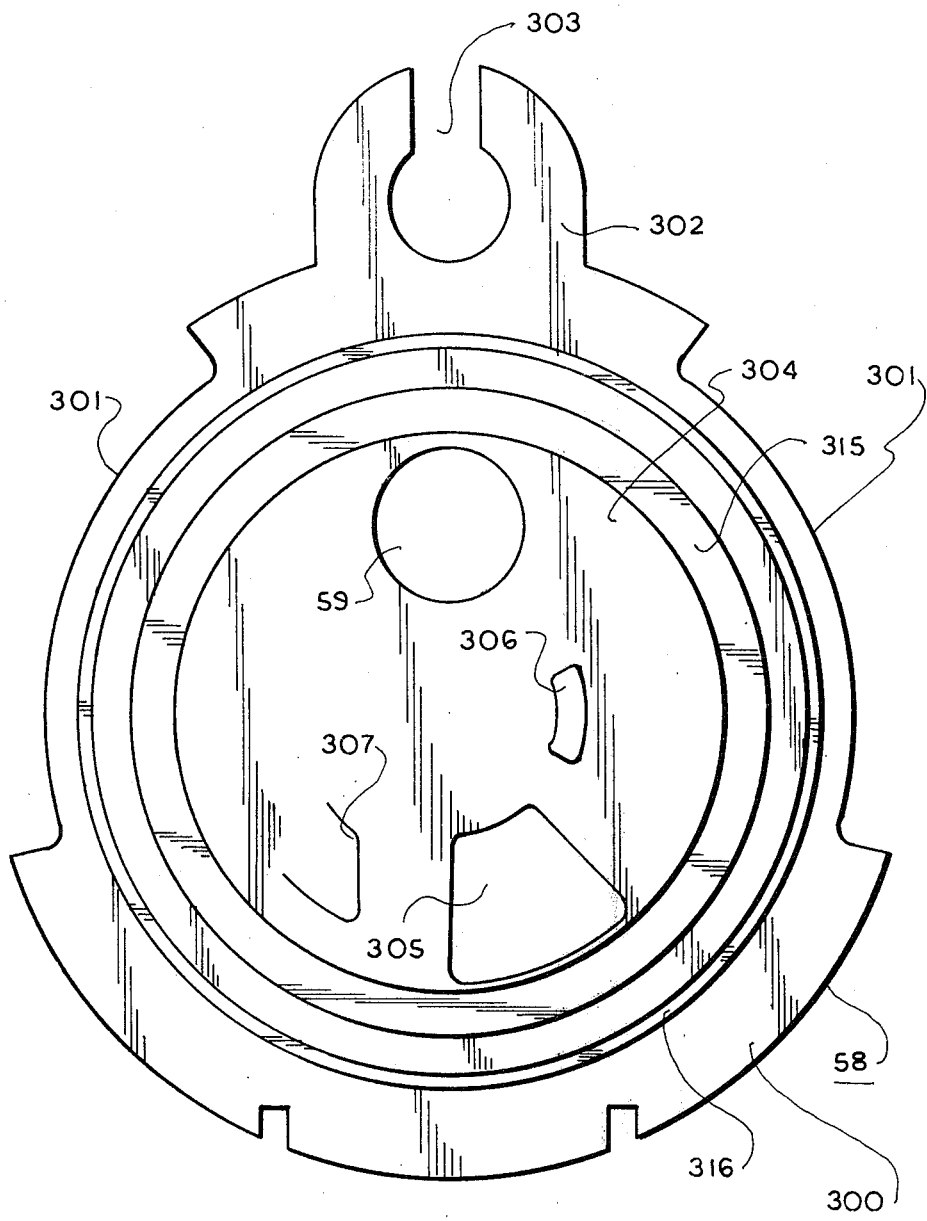
FIG. 31 is a rear view of the shutter retainer for the front housing.

As illustrated in FIG. 4, the shutter retainer 58 is fixedly mounted within the chamber 250 of the front housing. This shutter retainer is more fully illustrated in FIGS. 29, 30 and 31. The shutter retainer has a generally circular lower portion 300 adapted to be fit within the chamber 250 at the edges thereof. An upper projection 302 of the shutter retainer surrounds the axis of the viewfinder, and has an upper gap 303 around which the upper portion 254 of the front housing extends.

The central web 304 of the shutter retainer has an aperture 59, as discussed with reference to FIG. 4. This aperture is aligned with the optical axis of the camera. An arcuate projection 305 is provided on the rear of the web, i.e., the side facing the cassette, and a projection 306 is provided on the front of the web.

In addition, on the rear surface of the shutter retainer, a ramp 307 is provided spaced from the projection 305. The ramp 307 is provided in order to prevent accidental closing of the optical path between the lens and the film, due to jarring or the like, which may effect rotation of the upper disk. Hence, as illustrated in FIG. 31A, the ramp 37 is of less height than the projection 35, and is spaced from the projection 305 a sufficient distance that the projection 134 of the upper disk of the cassette may ride up on the ramp, during setting of the camera, and become locked in the space between the ramp 307 and the projection 305. Thereby, accidental jarring of the camera will not permit release of the upper disk to close the optical path to the film. These projections will be discussed in greater detail in the following paragraphs.

A hub 310 extending centrally from the front of the web has a central aperture 311, for receiving and holding the shaft 63 as illustrated in FIG. 4.

The annular projection 67 extends from the front of the central web, surrounding the aperture 59, and radially beyond the projections 305 and 306 on the rear side of the shutter retainer. Immediately radially outwardly of the annular portion 58, the surface of the web in the region 315 angles rearwardly radially outwardly, as more clearly seen in FIG. 4. From the end of the portion 315, the web thence extends directly outwardly.

The rear surface of the shutter retainer 58 is further provided with an annular ridge 316 adapted to extend into a similar shaped groove 317 of the cassette housing, when the camera is closed, to serve as a light baffle.

The shutter 64 of FIG. 4 is more fully illustrated in FIGS. 32, 33 and 34. The shutter has a generally circular disk shaped portion 320 with a central hub 321 for receiving the shaft 63 of FIG. 4, thereby to permit rotation of the shutter.

A generally rectangular aperture 322 is provided extending through the disk 320, and is alignable with the optical axis of the camera. In other words, the aperture 322 is of sufficient radial dimension that it can fully open the optical aperture of the camera, as it sweeps thereby. A plurality of projections 322 is provided at the periphery of the disk 320, spaced from the aperture 322. These projections 323 define hollow chambers 324, as more clearly seen in FIG. 33, for holding the magnets 65 as illustrated in FIG. 4. A pair of raised stop ribs 325 may also be provided on the disk 320. As further shown in FIG. 4, the shutter may have a backup plate 326 affixed to the front side of the shutter disk 320, for example, by means of rivets (not shown) extending through a plurality of apertures 327 of the shutter disk 320. The plate 326, of course, also is provided with a rectangular aperture of the same shape and aligned with the aperture 322.

Figure 35:
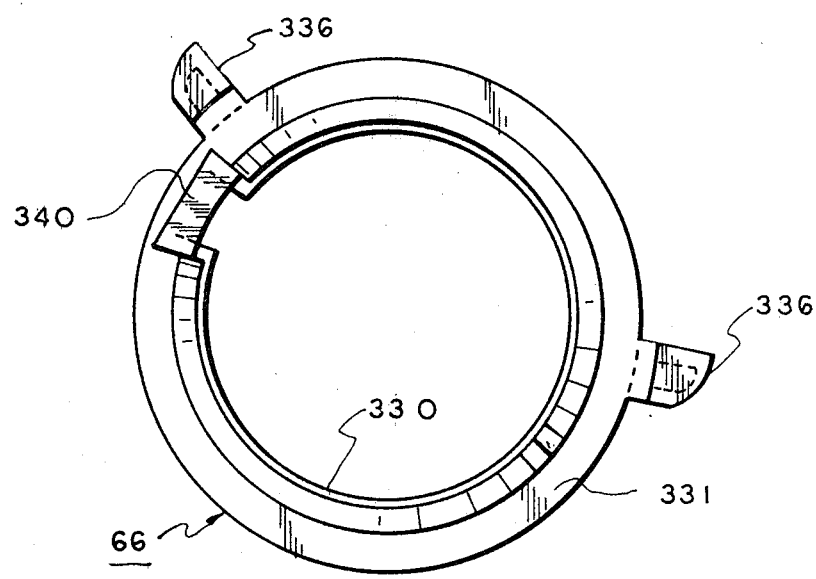
FIG. 35 is a front view of the actuator.
Figure 36:
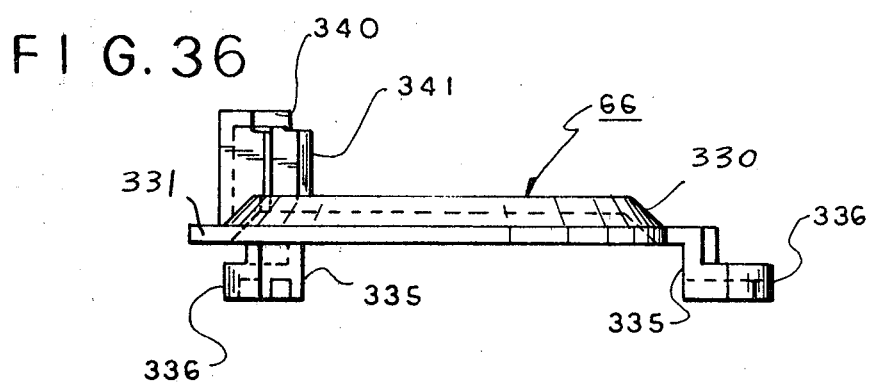
FIG. 36 is a side view of the actuator.

The actuator, for actuating the shutter, is more clearly seen in FIGS. 35 and 36. The actuator is generally annular, having a tapered inner edge 330 adapted to ride on the tapered surface 315 of the shutter retainer. In addition, the actuator ring has a radially outwardly extending flange 331 adapted to ride on the forward surface of the periphery of the shutter retainer as shown in FIG. 4. At a pair of locations at the periphery of the actuator, projections 335 extend rearwardly in the camera, and are terminated by radially outwardly extending knobs 336. The projections 335 are adapted to extend rearwardly through the peripheral arcuate cutouts 301 of the shutter retainer, whereby the knobs 336 may thence project radially outwardly from the camera, through suitable arcuate peripheral recesses in the cassette housing. The knobs 336 engage the rear surface of the front housing, to thereby hold the actuator ring against the rear inner surface of the shutter retainer. With this arrangement, it is apparent that a degree of rotary movement is possible for the actuator, and the two knobs 336 are provided so that an operator can rotate the shutter back and forth between limit stops defined by the ends of the arcuate cutouts 301 of the shutter retainer.

A magnet housing 340 is also provided extending from the rim of the actuator, for holding a magnet 341 immediately adjacent to the outer surface of the tubular portion 67 of the shutter retainer. It is therefore apparent that the magnet 341 may be moved, by an operator, back and forth in an arcuate locus against the outside of the shutter retainer, to thereby magnetically influence the magnets 65 on the shutter.

OPERATION

In order to load film in the cassette, which may be effected at the factory, the disk spring 102 is assembled in the gear cup, and the film 104 is placed in the gear cup, with the central aperture thereof engaging the upwardly projecting hub of the gear cup. The gear cup is then snapped back into the lower recess of the cassette. Of course, all of these steps are performed in the dark, so as not to expose the film.

In addition, the aperture 132 of the upper disk must not be aligned with the aperture 121 of the lower disk. For that purpose, the upper disk 101 is rotated about its axis, relative to the lower disk 100, so that the downwardly extending rim 133 of the upper disk engages the side of the upwardly extending projection 122 of the lower disk, with the apertures 132 and 121 being approximately 180° apart. In other words, in the illustrated embodiment, the upper disk 101 should be rotated clockwise with respect to the lower disk, until the rim 133 engages the projection 122 of the lower disk, at which time no more relative rotation in the same direction is possible. This step should of course also be performed in the dark.

At this time, the relative angular position of the gear cup with the lower disk is not of importance.

Following the loading of the cassette in the above manner, the camera is opened, and the cassette inserted in the cassette housing, so that the gear of the cassette engages the internal ring gear of the cassette housing. The housing may now be snapped shut.

In order to take the first picture, the disk of the cassette must be rotated, so that the apertures are aligned with one another and with the optical axis of the camera. It will be noted that, although the upper disk 101 and the gear cup 103 may rotate with respect to the lower disk 100, there is friction between the upper and lower disks, and the ridges 126 of the upper disk and 148 of the gear cup engage, so that, unless, restrained by a positive stop, the upper and lower disks will rotate with the gear cup, when driven by the internal ring gear. With this in mind, after the cassette has been installed in the camera, and the camera closed, the cassette is rotated clockwise (as viewed from the front or lens side of the camera) by means of the internal ring gear 200. Upon sufficient turning of the gear, the forwardly extending projection 134 of the upper disk of FIGS. 10 and 11 will engage the rearwardly extending projection 305 of the shutter retainer 58, and the projection 134 will lock behind the ramp 307. This will occur at the time at which the aperture 132 of the upper disk is aligned with the aperture 59 of the shutter retainer. As a consequence, upon further rotation of the gear, the upper disk will remain stationary, and the lower disk will hence rotate with respect to the upper disk. Upon this further rotation of the internal ring gear, the rearwardly extending rim 133 of the upper disk will be moved away from the forwardly extending projection 122 of the lower disk, until such time as the rim 133 of the upper disk engages the other side of the projection 122 of the lower disk, at which time the apertures of the upper and lower disks will be aligned. Further rotation of the lower disk in this direction is hence not possible, and, if desired, the internal ring gear may be still further rotated, due to the permissable slippage between the lower disk and the gear cup, in order to align indicia of the gear at a desired position.

At this time, it will be apparent that the apertures of the disk, the shutter retainer and the front housing will be aligned, so that the film may be exposed upon operation of the shutter. It is further evident that the gear may now be stepped in the same direction, to enable sequential exposure of the different areas of the film, as shown in FIG. 6.

The forward extending projection 306 of the shutter retainer, is positioned to engage the two rearwardly extending projections 325 of the shutter (FIG. 32) at determined angular displacements. Specifically, one of the projections 325 will engage the projection 306 when the shutter aperture 322 is spaced a determined distance from one side of the optical axis of the camera, and the other of the projections 325 will engage the projection 306 when the shutter aperture 322 is at an equal distance from the opposite side of the optical axis of the camera. These projections thereby permit movement of the shutter 64 through a limited angular displacement, with the aperture of the shutter being aligned with the aperture of the camera only between these end positions or stops and the exposure being the same regardless of the direction of movement of the shutter.

As also previously discussed, the shutter actuator 66 may be reciprocated through a given arc from externally of the camera, by means of the externally available knobs 336. This enables the magnet 341 of the actuator to be moved through a given angular displacement to magnetically influence the magnets 65 of the shutter.

Figure 37:
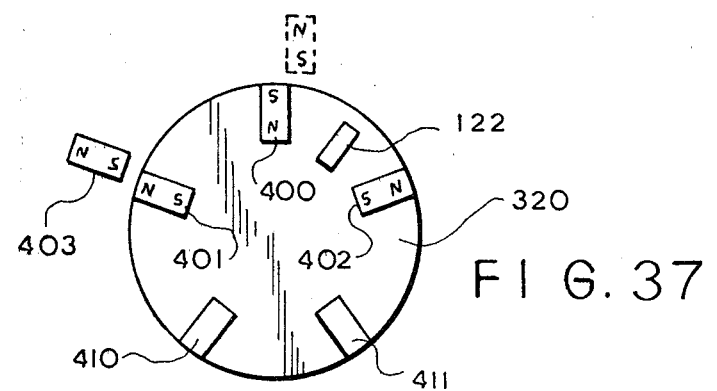
FIG. 37 is a simplified sketch illustrating the operation of the shutter.

The action of the shutter is more clearly seen in the simplified drawing of FIG. 37, which shows five equally spaced positions about the periphery of the shutter disk 320, with magnets at three adjacent positions. The center magnet 400 has its south pole directed radially outwardly, and the outer magnets 401 and 402 have their north poles directed radially outwardly. The magnet 403 of the actuator has its south pole directed radially inwardly, i.e., so that it effects a repulsion force with respect to the central magnet 400 and an attractive force with respect to the outer magnets 401 and 402 of the shutter disk. In the representation of FIG. 37, it is assumed that the shutter disk 320 has turned completely in the clockwise direction against its stop. The shutter disk, in this embodiment, has a permissable angular displacement of about 130° while the actuator magnet 403 has a permissable movement of about 75°. Thus, in the illustrated position, the magnet 403 has been moved to its most counterclockwise position as illustrated. At this point, it will be seen that the magnet 401 still tends to be attracted to the actuator magnet 403, to more fully urge the shutter against its clockwise stop, and that the repulsion action with respect to the magnet 400 acts in the same direction, thereby firmly holding the shutter against the stop. If now the magnet 403 is moved to its most clockwise position, as illustrated in dashed lines, it is apparent that a repulsion force will act on the magnet 400 of the shutter, to drive the shutter in the counterclockwise direction, and that this force will subsequently be reinforced by the attraction force between the shutter magnet 402 and the actuator 403 at the new clockwise position. The initial force on the shutter will be that of repulsion, from the magnet 400, and this action will be smoothed at the latter portion of the shutter movement, by the attraction force of the magnet 402. It is therefore apparent that the plurality of magnets act in combination, to rapidly move the shutter in a smooth motion.

As illustrated in FIG. 37, two additional positions 410 and 411 are provided at the periphery of the shutter disk 320. Suitable weights are preferably mounted at these positions on the shutter, in order to equalize the dynamic forces on the shutter. These weights may, if desired, be additional magnets, to further control the movement of the shutter. For example, the additional magnet may be poled the same as the magnets 401 and 402.

The arrangement of FIG. 37 further provides the advantage that the shutter is positively stopped at its end positions, and at no point can it be unintentionally hung up at other than an end position.

The showing of FIG. 37 further illustrates the aperture 122 between a pair of the magnets. The actual position of the aperture is not critical, since it can be theoretically located anywhere on the shutter that is not blocked by other elements thereof.

After the last region of the film has been exposed, the internal ring gear 200 may be rotated in the opposite direction, thereby removing the alignment between the apertures of the disks and the shutter retainer. If this movement is continued sufficiently long, the apertures of the upper and the lower disks 101 and 100 respectively will be moved to their initial, opposite positions apart.

In order to remove the exposed film, the cassette is removed from the camera. Then, in the absence of light, the gear cup of the cassette may be snapped out of the rear recess of the cassette housing.

MODIFICATIONS

Figure 38:
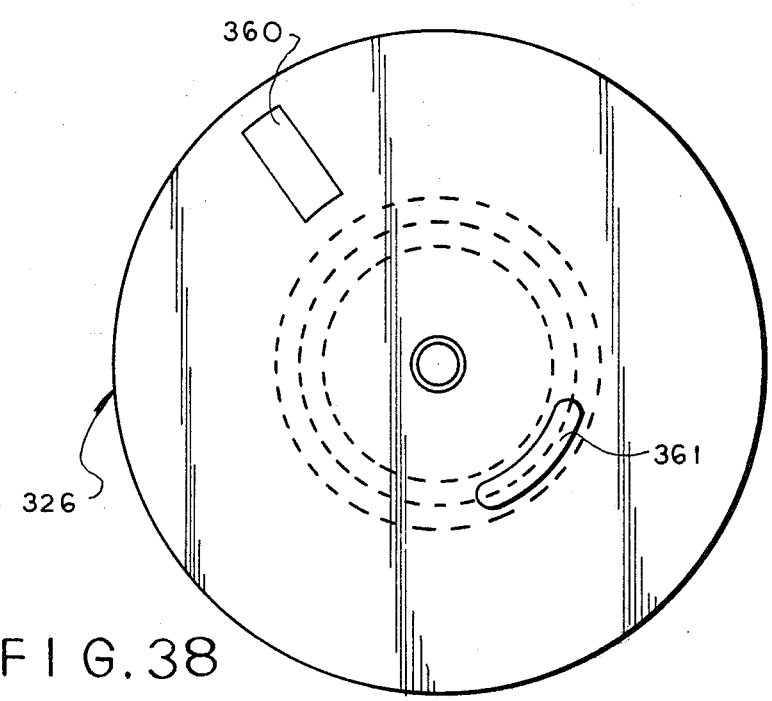
FIG. 38 is a front view of a modification of the front portion of the shutter.
Figure 39:
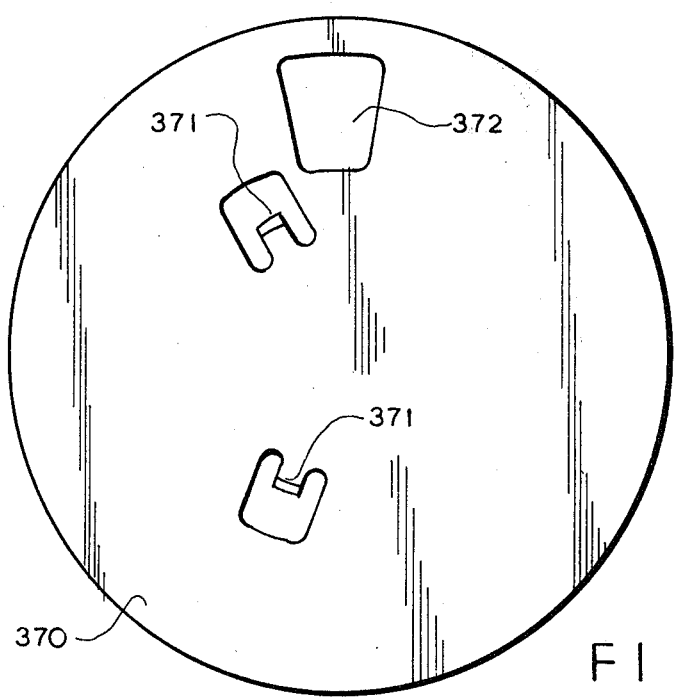
FIG. 39 is a front view of a dark shade disk that may be employed in the camera of the invention.

FIG. 38 shows a modification of the front portion 326 of the shutter. In this figure, the disk 326 is provided with the aperture 360 aligned with the aperture of the shutter, as well as an arcuate aperture of recess 361 on a side of the disk opposite the aperture or window 360. In addition, a dark shade disk 370 is provided at the front of the disk 362. The dark shade disk 370 has a rearwardly projecting tang 371 adapted to engage the arcuate slot 361 of the disk 326. The dark shade disk 370 is hence rotatable through a given displacement with respect to the disk 326. The disk 370 of FIG. 38 is further provided with an aperture or window 372 which is alignable, at a given angular displacement, with the window or aperture of the shutter. Still further, the disk 370 has a forwardly extending tang 371 which engages an arcuate slot (not shown) in the adjoining face of the front housing 51. The dark shade disk 370 is preferably of non-magnetic metal or other non-magnetic material. In operation, during the exposure sequence, when the opening in the shutter finishes passing in front of the lens, so that there is no longer any light passing through the optical system to the negative, the arcuate groove 361 in the disk 326 picks up the corresponding tang of the dark shade, and carries it to a new position at which it blocks light. When the shutter is moved in the opposite direction, however, the arcuate slot of the disk 326 picks up the corresponding tang of the dark shade, to effect the movement of the dark shade such that its aperture becomes aligned with the optical system. Accordingly, during one sense of rotation of the actuator, and the consequent opposite rotation of the shutter, the optical axis is blocked by the dark shutter, whereas opposite rotation of the two elements occurs at a time when the optical axis is not blocked by the dark shade. This arrangement thereby enables exposing the film only in one direction of movement of the actuator, since the optical axis is blocked by the dark shade when the actuator is moved in the opposite direction.

The other tang of the dark shade serves as a locking device so that, when the shade is at one of its stop positions, it may be held at the corresponding arcuate recess in the front housing, so that there will be no motion of the shade due to vibration. This results since one of the tangs of the dark shade prevents the shade from moving in one direction within the disk 326, while the disk 326 prevents it from moving in the opposite direction. The shutter is held from movement, of course, by the actuator magnet.

Figure 41:
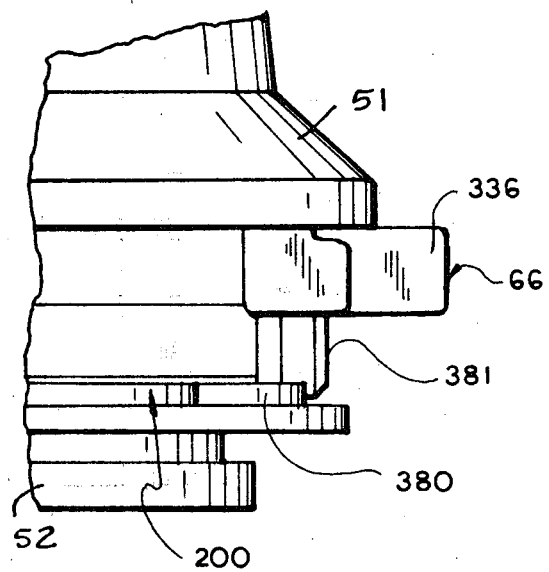
FIG. 41 is a partial view of the bottom of the camera, showing means for operating the internal tooth gear with the actuator.
Figure 40:
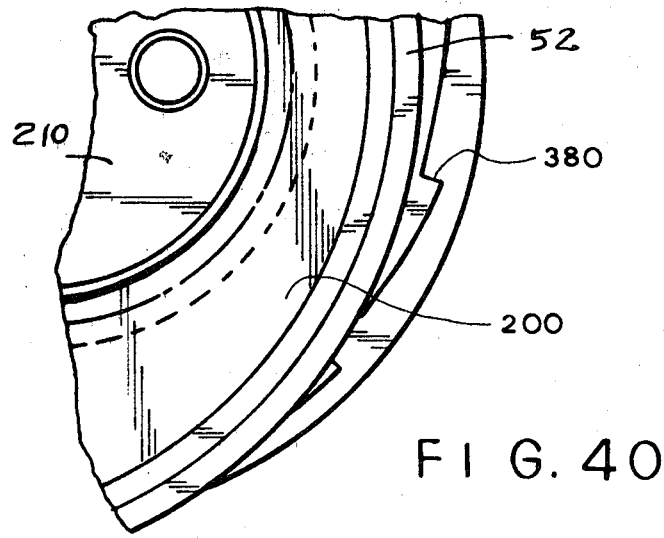
FIG. 40 is a partial view of the front of the cassette housing assembly, showing a modification of the internal tooth gear.

The above modification, employing the dark shade, also permits a modification of the camera wherein the actuator may also serve to advance the film. In this modification, as shown in FIG. 40, the outer periphery of the internal ring gear 200 is provided with ratchet teeth 380. In addition, as shown in FIG. 41, rearwardly extending projections 381 on the actuator 66, for example in the region of the knob 336, extend into engagement with the ratchet teeth 380 of the gear 200. As a consequence, when the actuator 66 is rotated one direction, the projection 381 catches the teeth of the ratchet 380, to simultaneously rotate the gear 200, and hence the film. In the other direction of rotation, however, the projection 381, which may be flexible, rides outside the ratchet teeth 380 so that the internal ring gear 200 is not turned. Consequently, the camera may be arranged so that movement of the actuator in one rotary direction rotates the film, and movement of the actuator in the opposite direction actuates the shutter to expose the film.

Figure 42:
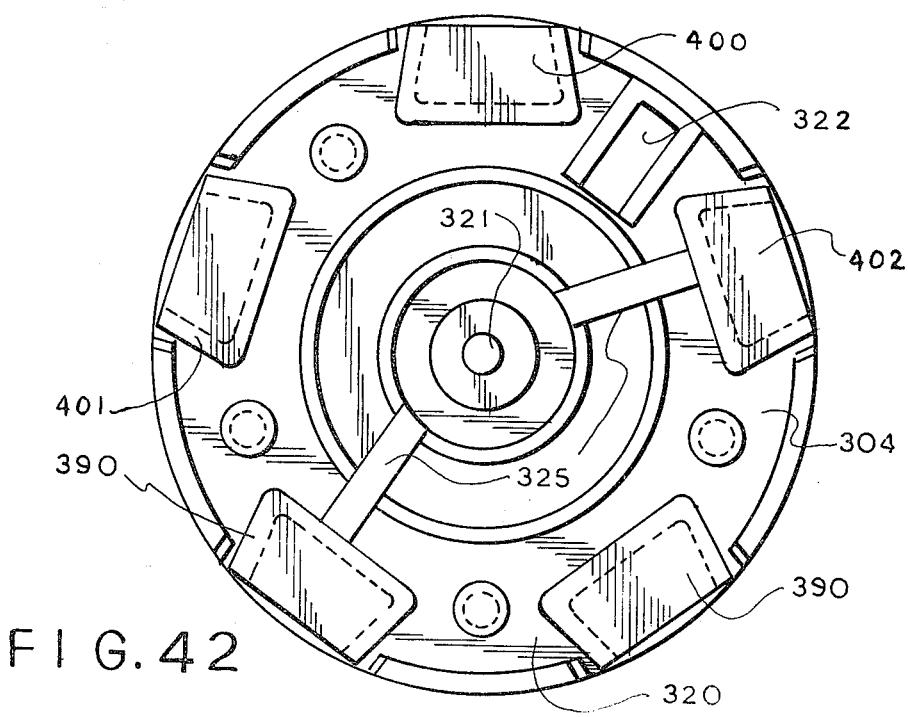
FIG. 42 is a rear view of a modification of the shutter.

In a still further modification of the invention, the shutter may be provided with additional magnets for improved operation. The shutter may thus have five magnets, as illustrated in FIG. 42. In addition to the magnets 400, 401 and 402 as above discussed, the shutter disk 320 also carries three further magnets 390, spaced equally with the magnets 400, 401 and 402 about the periphery of the disk. These magnets are poled to enhance the shutter movement. For example, the magnets 390 immediately adjacent to the magnets 401 and 402 may have the same polarities, so that, in addition to the repulsion movement provided by the magnets 400, an additional attraction force may also be provided, due to the provision of magnets 390. It will, of course, be apparent that other arrangement of magnets may also be provided. Further, additional magnets may be provided on the actuator, cooperating with the additional magnets on the shutter, for example, to enable repulsion action between all of the magnets.

Thus, in the example of the shutter employing five magnets, as above discussed, with the five magnets equally distributed at the periphery of the shutter, the magnets may be arranged with, for example, a first magnet having its south pole radially outwardly, the next two magnets having their north poles radially outwardly, and the remaining magnets having their south poles directed radially outwardly. In this arrangement, an actuator magnet may be provided to influence the two north pole magnets of the shutter, in this case, the actuator magnets having their north poles directed radially inwardly.

In any case, the magnets should be equally distributed about the periphery of the shutter, to provide an inertial balance of the shutter. This equal distribution enables the operation of the shutter to be the same, independently of gravity, orientation, etc. The provision of five magnets, instead of three enables for example, the use of weaker magnets, and hence smaller magnets, or, alternatively, the provision of higher speed. Similarly, the provision of six magnets instead of five magnets either enables the magnets to be smaller of weaker, or, again, to provide higher speed of the shutter.

It will of course be apparent that the majority of the components of the camera in accordance with the invention, including the cassette, may be molded of plastic material, by conventional techniques. The invention is not limited, however, to the type of material employed.

FIGS. 43 and 44 show a modification of the lower disk of the cassette, which, in combination with the modified upper disk shown in FIGS. 45 and 46, improves the cassette from a standpoint of blocking stray light from reaching the film. In these figures, insofar as possible, the reference numerals will be the same as those of the earlier described cassette, employing prime marks, in order to enable a clearer understanding of the invention.

Referring now to FIGS. 43 and 44, the lower disk 100' has an annular outer rim 115', a central hub 116', an aperture 121', and a web 118' extending between the hub and the outer rim. The lower disk of FIGS. 43 and 44 does not have the large quadrant-shaped projection 122 of FIG. 8, but, instead, the optical aperture 121' is provided with an axially extending rim 500, and a smaller projection 501 is provided extending upwardly at a position not quite 180° from the optical axis. The lower disk also has the annular ridges 119' and 120' in its lower recess, for engaging the film.

The modified upper disk 101' of FIGS. 45 and 46 has a central aperture 130' and an optical aperture 132'. This aperture is not provided with a rim, however, so that the rim 500 of the lower cassette of FIGS. 43 and 44 engages the backside of the web 502 of the upper disk. In addition, the forwardly extending projection 134', adapted to engage the rearwardly extending projections of the shutter retainer, has a projection 503 extending rearwardly from its hollow interior, so as to be able to engage the rim 500 of the lower disk, at determined angular relationships between the upper and lower disk.

Insofar as the operation of the cassette is concerned, it is the same as the earlier described cassette, with the exception that different projections are engaged to effect the desired movement. Thus, the rearwardly extending projection 503 is adapted to engage the projection 501 of the lower disk as one limit stop, and to engage the rim 500 of the lower disk as the other limit stop. When the optical apertures of the upper and lower disks are not aligned, the rim 500 serves as a light trap, to prevent light from reaching the film.

While the invention has been disclosed and described with references to a limited number of embodiments, it will be apparent that variations and modifications may be made therein, and it is intended in the following claims to cover each such variation and modification as falls within the true spirit and scope of the invention.

What is claimed is:

1. In a camera having a housing and a film cassette rotatably mounted therein, said cassette having means for holding a disc-shaped film therein in a plane perpendicular to the axis thereof, said camera further comprising a shutter assembly for enabling exposure of film in said cassette, and means for rotating said cassette from externally of said housing, said housing including a cassette housing having a chamber for receiving the cassette and a front housing coupled to the cassette housing so as to enable the loading and unloading of said cassette in said cassette housing, said front housing having lens means with an optical axis parallel to and displaced from the axis of the cassette, the shutter assembly being mounted in said front housing to selectively block the passage of light between said lens means and said cassette; the improvement wherein said cassette has an element with gear teeth, and said means for rotating said cassette from externally of said housing comprises an internal ring gear having internal teeth engaging the teeth of the element of said cassette, the rim of said internal ring gear extending, on at least one side of said camera, beyond said cassette housing.

2. The camera of claim 1 wherein an actuator is provided in said housing for actuating said shutter mechanism, and means on said actuator extend into engagement with said internal ring gear, whereby said actuator also rotates said element of said cassette.

3. The camera of claim 2 wherein said internal ring gear has ratchet teeth on its outer periphery, said means on said actuator engaging said internal ring gear comprising a flexible element extending to engage said ratchet teeth, whereby said internal ring gear rotates with said actuator only in one direction.

4. A film cassette for a disc-shaped film, comprising a first disc-shaped element having an annular rim with a central web, thereby defining first and second recesses on opposite sides of said web, a second disc-shaped element fit in said first recess to be rotatable with respect to said first element, a third disc-shaped element releasably fit in said second recess to be rotatable with respect to said first element, spring means in said second recess whereby disc-shaped film may be fit in said second recess and held against said web by said spring means and said third element, means for rotating said third element, and alignable apertures in said first and second elements for exposing said film in said second recess.

5. The film cassette of claim 4 wherein said third disc-shaped element is snap-fit in said second recess.

6. The film cassette of claim 4 wherein said first and second elements have engagable projections, whereby in one relative sense of rotation of said first and second elements said first and second projections engage when the apertures of said elements are in alignment, and in the other relative direction of rotation said first and second projections engage when said apertures are out of alignment.

7. The film cassettes of claim 6 wherein said second projection on said second element comprises a rim of the aperture of one of said first and second elements.

8. The film cassette of claim 4 comprising means on said first and third elements for restraining relative rotation therebetween.

9. The film cassette of claim 8 wherein said restraining means comprises a plurality of ridges distributed in a circle on said third element, and a plurality of ridges distributed in a circle on said first element and directed to axially mesh with the ridges of said third element.

10. The film cassette of claim 4 wherein said spring means comprises a disc-shaped element having rearwardly extending spring fingers for engaging the third element.

11. A camera comprising a housing, means for holding a film in said housing, a lens system in said housing and having an optical axis intersecting said film, a shutter mounted to selectively intercept light along said axis from impinging on said film, said shutter having an aperture alignable in one angular displacement with said optical axis, and an actuator for controlling said shutter, said shutter having a first magnet thereon, said actuator having a second magnet positioned to magnetically influence said first magnet by repulsion, said shutter further having third and fourth magnets on opposite sides of said first magnet and poled opposite with respect to said first magnet, and means for moving said actuator.

12. The camera of claim 11 wherein said actuator is mounted to reciprocate with respect to said magnets on said shutter, whereby said shutter snaps by repulsion magnetic forces between said first and second magnets and attraction between said third and fourth magnet and said second magnet back and forth across said optical axis.

13. The camera of claim 12 wherein said actuator comprises a ring having said second magnet mounted thereon, said ring having projections extending outwardly of said camera for manual rotation of said ring through a given angle.

14. The camera of claim 11 further comprising a disc-shaped dark shade mounted forwardly of said shutter and having a tab extending into an arcuate slot in said shutter for permitting a determined angualr displacement therebetween, said dark shade further having means engaging said housing to permit limited rotation with respect thereto, said dark shade further having an aperture alignable with said optical axis, said tab being positioned whereby the aperture of said dark shade disc is aligned with said optical axis by one direction of movement of said shutter, and is displaced from said optical axis upon rotation of said shutter in the opposite direction.

15. In a camera assembly wherein a first aperture for the passage of light along an optical axis is provided in a housing; the improvement comprising a shutter in said housing, said shutter being pivotally mounted on an axis parallel to said optical axis, said shutter having a second aperture alignable at a given angular displacement with said first aperture, said shutter having circumferentially spaced first, second and third magnets, said second magnet being between said first and second magnets and being poled oppositely with respect thereto, and an actuator, said actuator having a magnet positioned to magnetically influence the magnets of said shutter, means for moving said actuator with respect to the magnets of said shutter, the magnet of said actuator being poled to have one of its poles directed toward the same pole of the second magnet of said shutter, whereby magnetic repulsion forces between said second magnet of said shutter and the magnets of said actuator and attraction forces between said first and third magnets and the magnet of said actuator effects a snapping action of said shutter with respect to said optical axis.

16. The camera of claim 15 wherein said actuator comprises a ring rotatably mounted with respect to the axis of said shutter, said ring being manually rotatable, whereby the magnet of said actuator is movable back and forth in an arcuate path with respect to said circumferentially spaced first, second and third magnets of said shutter.

17. In a camera having a cassette for holding a disc-shaped film, a cassette housing having a chamber extending from one side thereof for rotatably holding said cassette, a front housing hinged to said cassette housing for covering said side of said cassette housing, said front housing having an optical system along an optical axis, and a shutter having an aperture alignable with said optical axis, the improvement wherein said shutter comprises a disc-shaped element having a plurality of magnets mounted thereon, and further comprising an actuator ring rotatably positioned radially outwardly of said shutter disc and having a magnet mounted thereon to influence at least one magnet of said shutter by repulsion, and to influence at least another magnet of said shutter by attraction.

18. The camera of claim 17 wherein said front housing has a shutter retainer plate rearwardly of said shutter, said shutter retainer plate comprising means for pivotally mounting said shutter, said shutter retainer plate further comprising a forwardly extending projection engagable with rearwardly extending projection means on said shutter for limiting the angular displacement of said shutter.

19. The camera of claim 18 wherein said shutter retainer plate has an aperture aligned with the optical axis of said front housing, and a rearwardly extending projection.

20. The camera of claim 17 comprising an internal ring gear rotatably mounted in said cassette housing and having internal teeth for rotating a cassette therein, said gear extending through said cassette housing and being externally manipulatable.

21. A shutter assembly comprising a disc, means mounting said disc for rotation through a given angular displacement, an optical aperture in said disc radially spaced from the axis thereof, at least three circumferentially spaced magnets at the periphery of said disc, a first of said magnets having its pole of one polarity directed radially outwardly, and second and third of said magnets being positioned spaced from opposite sides of said first magnet and poled oppositely with respect thereto, and an actuator magnet mounted for movement in an arcuate path radially outwardly of said first, second and third magnets and having its pole of said one polarity directed radially inwardly.

22. The shutter assembly of claim 21 further comprising fourth and fifth magnets affixed to the periphery of said discs, the magnets on said disc being equally distributed about the periphery of said disc.

23. The shutter assembly of claim 21 further comprising fourth, fifth and sixth magnets mounted as the periphery of said disc, whereby the six magnets on the periphery of said disc are distributed equally thereabout.

24. The shutter assembly of claim 21 comprising a fixed annular member surrounding said disc, an actuator ring mounted for rotation on said annular member, said actuator magnet being affixed to said ring, and means for manually rotating said ring.

25. A camera comprising a housing, means for holding a film in said housing, a lens system in said housing and having an optical axis intersecting said film, a shutter mounted to selectively intercept light along the axis from impinging on said film, and an actuator for controlling said shutter, said shutter comprising a disc-shaped element having a first magnet thereon and further magnets spaced about its periphery, said actuator having a second magnet positioned to magnetically influence said first magnet by repulsion, and means for moving said actuator.

* * * * *